(12) United States Patent
Thompson

(10) Patent No.: US 12,516,700 B2
(45) Date of Patent: Jan. 6, 2026

(54) SPHERICAL BEARING ASSEMBLIES WITH LOCKING BEARING ADAPTERS, LINE BORING MACHINES INCLUDING THE SAME, AND ASSOCIATED METHODS

(71) Applicant: Climax Portable Machine Tools, Inc., Newberg, OR (US)

(72) Inventor: Andrew Gordon Thompson, Flat Rock, NC (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 506 days.

(21) Appl. No.: 18/296,284

(22) Filed: Apr. 5, 2023

(65) Prior Publication Data

US 2023/0349425 A1 Nov. 2, 2023

Related U.S. Application Data

(60) Provisional application No. 63/335,375, filed on Apr. 27, 2022.

(51) Int. Cl.
*F16C 11/06* (2006.01)
*B23B 29/02* (2006.01)
(Continued)

(52) U.S. Cl.
CPC ............. *F16C 35/02* (2013.01); *B23B 29/02* (2013.01); *F16C 11/0614* (2013.01); *F16C 23/043* (2013.01); *F16C 2322/39* (2013.01)

(58) Field of Classification Search
CPC .... F16C 11/0614; F16C 23/04; F16C 23/043; F16C 23/045; F16C 35/02; F16C 2322/39; B23B 29/02
See application file for complete search history.

(56) References Cited

U.S. PATENT DOCUMENTS

| | | | |
|---|---|---|---|
| 2,043,272 A | * | 6/1936 | Wallgren ................ F16C 35/02 411/266 |
| 5,642,969 A | | 7/1997 | Strait |
| 6,939,053 B2 | | 9/2005 | Nisley et al. |

FOREIGN PATENT DOCUMENTS

DE        9206149 U1 *   9/1992

OTHER PUBLICATIONS

Climax Portable Machining & Welding Systems, "BB4500-BB5000 Boring Machine Operating Manual" R3, 1, 27-45, 81-136 (Feb. 2021).

\* cited by examiner

*Primary Examiner* — Phillip A Johnson
(74) *Attorney, Agent, or Firm* — Kolitch Romano Dascenzo Gates LLC

(57) ABSTRACT

Spherical bearing assemblies comprise an outer ring, an adjustable receiver adjustably coupled to the outer ring and at least partially received within the outer ring, and a locking bearing adapter configured to operatively couple the adjustable receiver to a boring bar of a machine tool. The locking bearing adapter includes a tapered sleeve partially received within the adjustable receiver bore and tapered toward the outboard direction, an interior nut threadingly coupled to the tapered sleeve and configured to engage the adjustable receiver, and an exterior nut threadingly coupled to the tapered sleeve and positioned adjacent to the interior nut with the interior nut positioned between the exterior nut and the adjustable receiver. Line boring machines comprise a boring bar, a cutting tool, a spherical bearing mount assembly including a spherical bearing assembly, a rotational drive unit, and an axial feed unit.

20 Claims, 11 Drawing Sheets

(51) Int. Cl.
*F16C 23/04* (2006.01)
*F16C 35/02* (2006.01)

SPHERICAL BEARING ASSEMBLIES WITH LOCKING BEARING ADAPTERS, LINE BORING MACHINES INCLUDING THE SAME, AND ASSOCIATED METHODS

RELATED APPLICATION

This application claims priority to U.S. Provisional Patent Application No. 63/335,375, filed on Apr. 27, 2022, the complete disclosure of which is incorporated herein by reference.

FIELD

The present disclosure relates to spherical bearing assemblies with locking bearing adapters, line boring machines including the same, and associated methods.

BACKGROUND

Various examples of portable machine tools, such as line boring machines, utilize a boring bar that supports and drives a cutting tool for machining a surface of a workpiece. During operative use of such machines, the boring bar must be maintained in a predetermined orientation relative to the workpiece to ensure that the cutting tool follows a precise tool path. To this end, many examples of portable machine tools utilize bearings mounted relative to the workpiece to support the boring bar. In particular, in some examples, such bearings engage the boring bar such that a central axis of the boring bar remains fixed in position and orientation while permitting the boring bar to translate and rotate relative to the bearing in order to move the cutting tool through the tool path. Thus, in such applications, it is desirable to tighten the bearing upon the boring bar sufficiently tight to fix the central axis of the boring bar in place and sufficiently loose to permit translation and rotation of the boring bar. With the bearing tightened accordingly, it further is desirable to restrict the bearing from loosening from the boring bar, such as may result from vibrations produced during operative use of the machine tool. Thus, there exists a need for spherical bearing assemblies with locking bearing adapters, line boring machines including the same, and associated methods.

SUMMARY

Spherical bearing assemblies with locking bearing adapters, line boring machines including the same, and associated methods are disclosed herein. A spherical bearing assembly for a machine tool such as a line boring machine includes an outer ring, and adjustable receiver adjustably coupled to the outer ring, and a locking bearing adapter configured to operatively couple the adjustable receiver to a boring bar of the machine tool. The adjustable receiver includes an adjustable receiver inner surface that defines an adjustable receiver bore and that is tapered toward an outboard direction. The locking bearing assembly includes a tapered sleeve partially received within the adjustable receiver bore and tapered toward the outboard direction. The tapered sleeve includes a sleeve bore with a sleeve inner diameter and configured to receive the boring bar and a split seam configured to enable the tapered sleeve to radially expand and contract to adjust the sleeve inner diameter. The locking bearing adapter additionally includes an interior nut threadingly coupled to the tapered sleeve and configured to engage the adjustable receiver, as well as an exterior nut threadingly coupled to the tapered sleeve and positioned adjacent to the interior nut with the interior nut positioned between the exterior nut and the adjustable receiver. The exterior nut and the interior nut are configured to be operatively coupled to one another such that the interior nut and the exterior nut are locked in position relative to the tapered sleeve to restrict the sleeve inner diameter from varying during operative use of the spherical bearing assembly.

In some examples, a line boring machine includes a boring bar extending along a boring bar axis, a cutting tool operatively coupled to the boring bar for machining the surface of a workpiece, and a spherical bearing mount assembly at least partially supporting the boring bar. The line boring machine additionally includes a rotational drive unit (RDU) assembly configured to rotate the boring bar about the boring bar axis and an axial feed unit (AFU) assembly configured to translate the boring bar along the boring bar axis. The spherical bearing mount assembly includes a bearing mount body and a spherical bearing assembly operatively coupled to the bearing mount body.

In some examples, a method of utilizing a line boring machine includes operatively coupling a boring bar to a spherical bearing assembly and mounting a spherical bearing mount assembly relative to a workpiece.

DESCRIPTION

Figure 1:
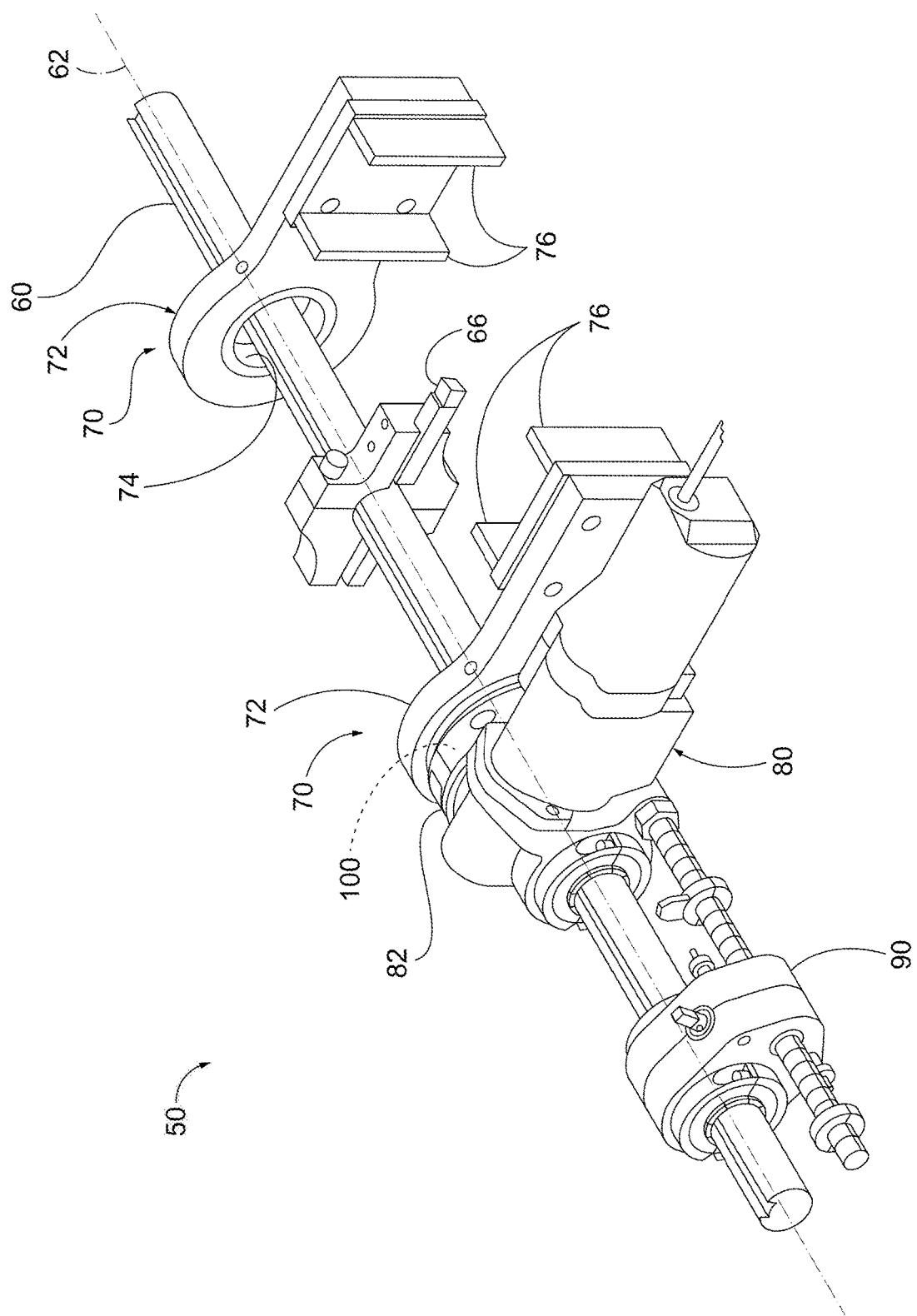
FIG. 1 is a top front side isometric view of an example of a line boring machine according to the present disclosure.

FIGS. 1-11 illustrate examples of spherical bearing assemblies 100, of line boring machines 50 including spherical bearing assemblies 100, and/or of methods 300 of utilizing line boring machines 50, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 3:
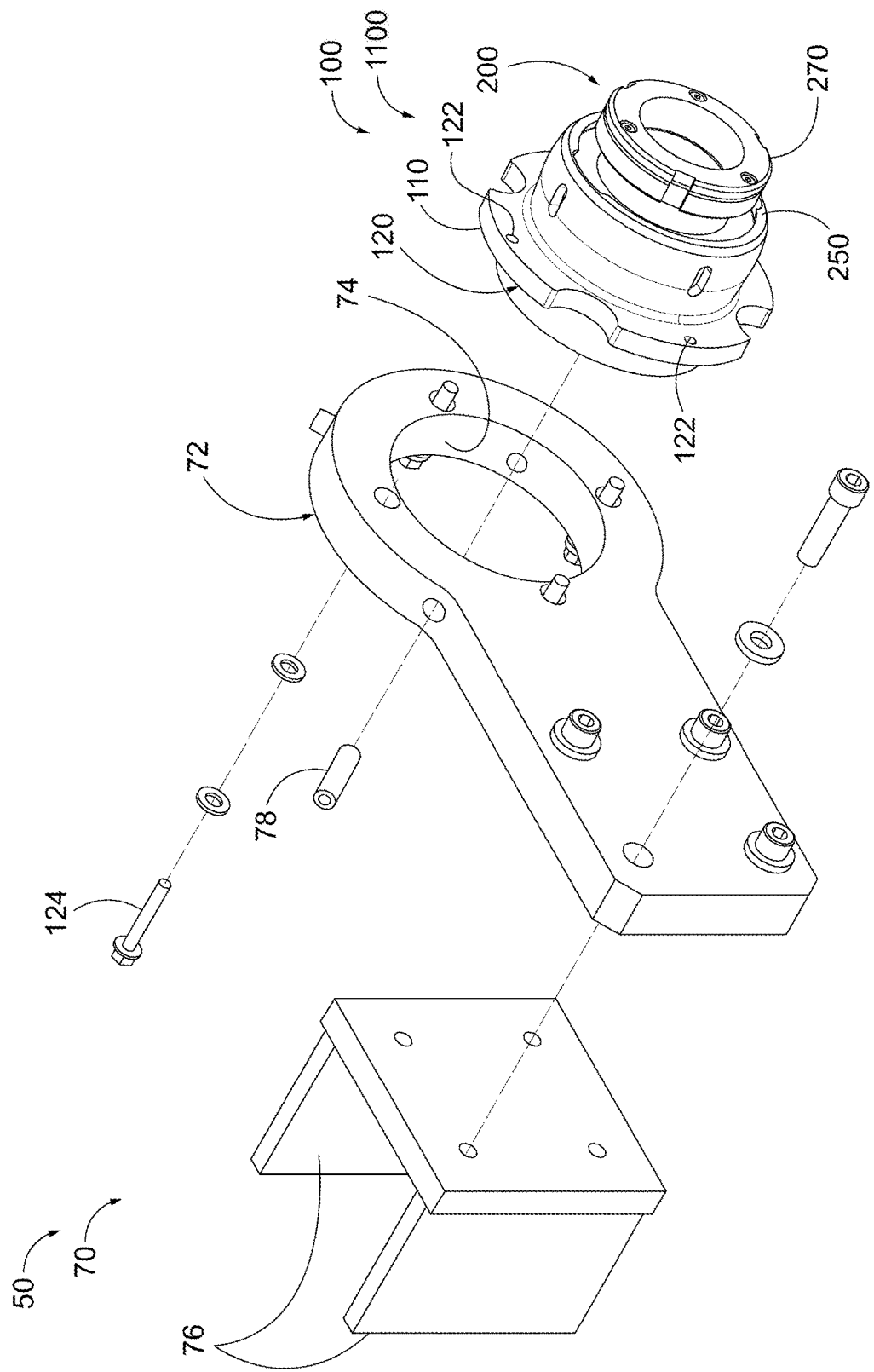
FIG. 3 is an exploded top front side isometric view of an example of a spherical bearing mount assembly according to the present disclosure.
Figure 4:
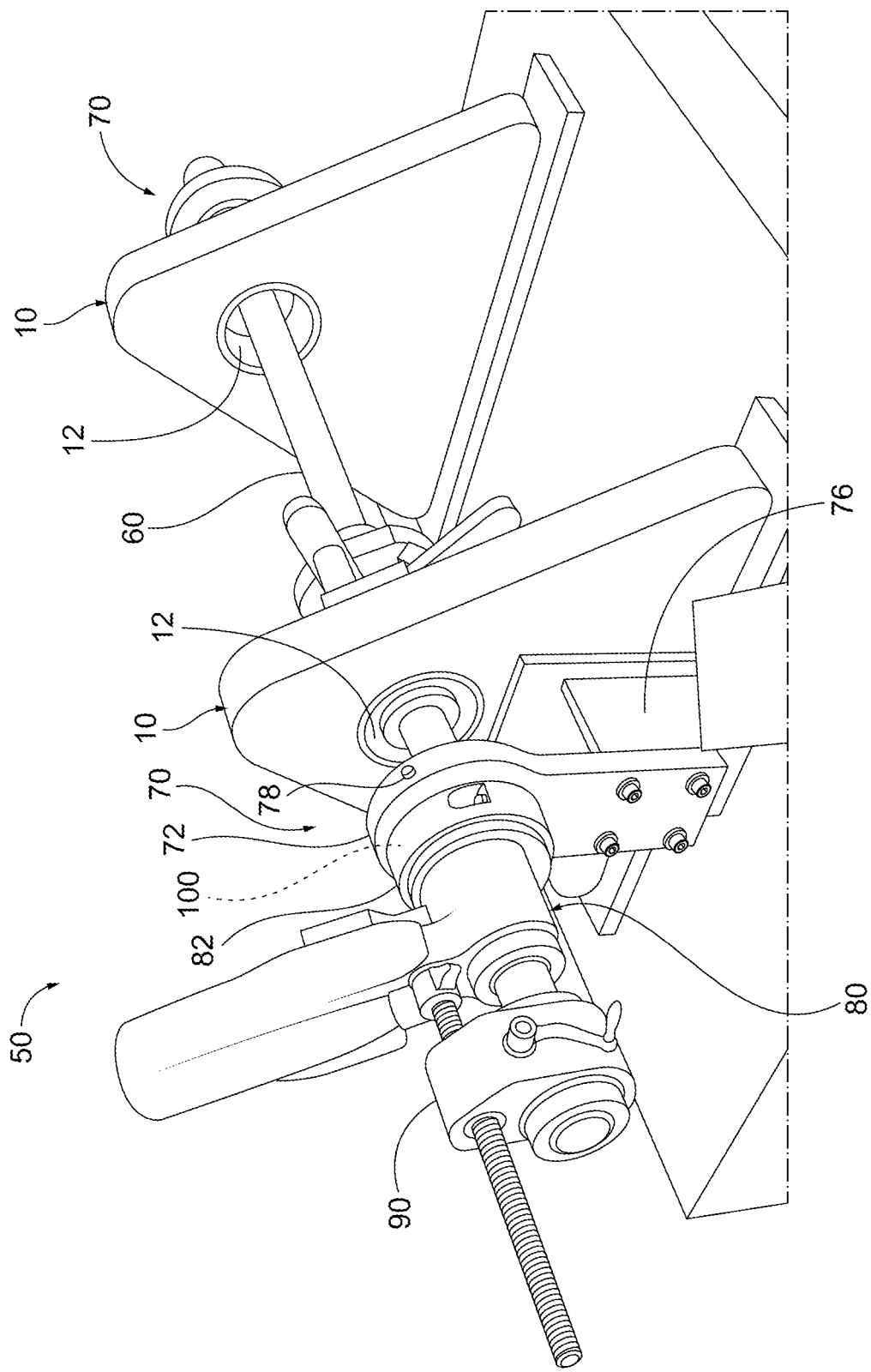
FIG. 4 is a top front side perspective view of a portion of an example of a line boring machine according to the present disclosure.
Figure 5:
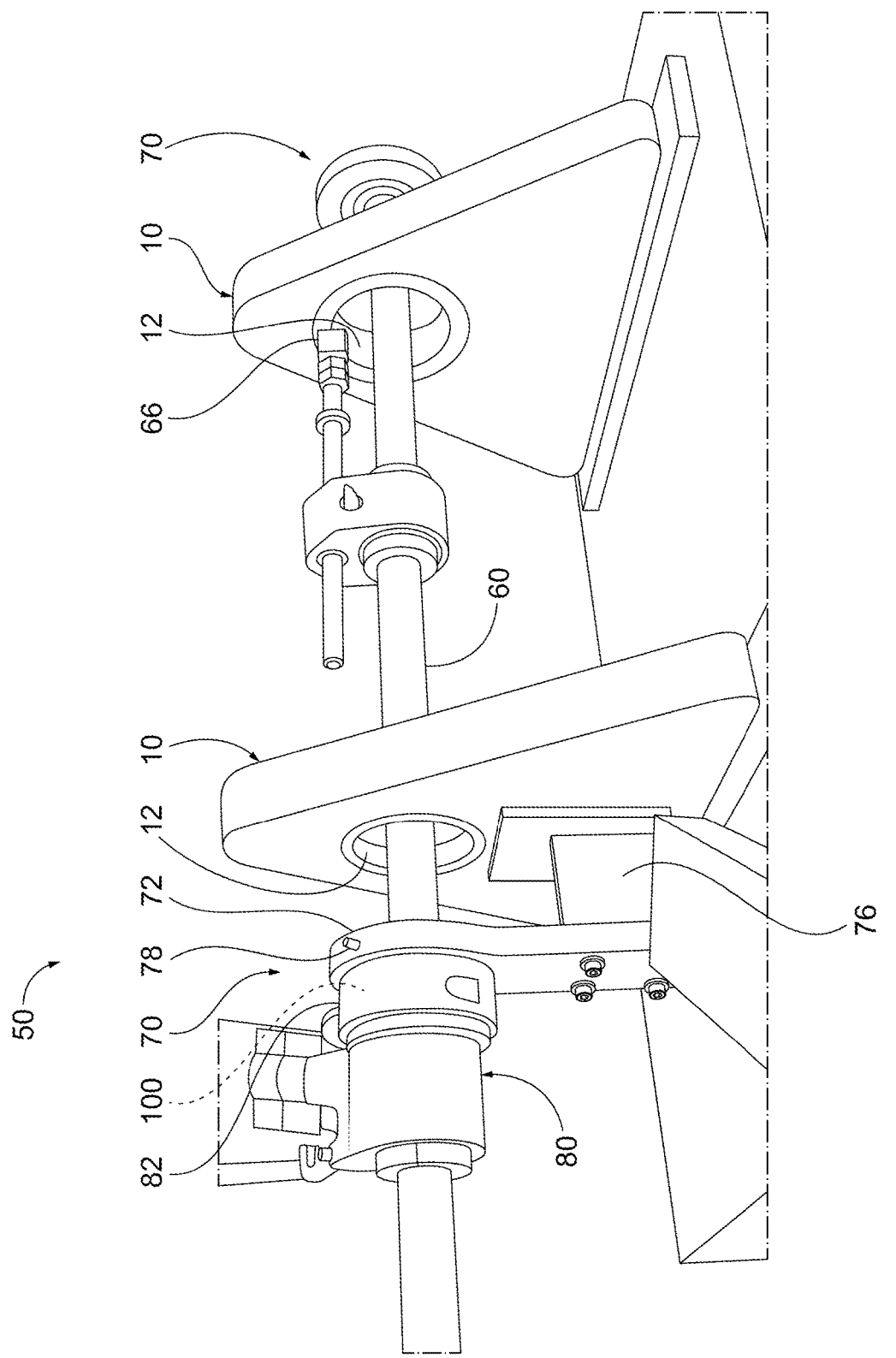
FIG. 5 is a top front side perspective view of the line boring machine of FIG. 4.

The present disclosure generally relates to bearings and bearing assemblies for supporting a boring bar of a machine tool relative to a workpiece. In particular, the present disclosure generally relates to examples in which the machine tool is a line boring machine 50, examples and portions of which are illustrated in FIGS. 1 and 4-5. As illustrated in FIGS. 1 and 4-5, line boring machine 50 includes a boring bar 60 extending along a boring bar axis 62 (shown in FIG. 1) and a cutting tool 66 (shown in FIGS. 1 and 5) operatively coupled to boring bar 60 for machining a surface of a workpiece 10 (shown in FIGS. 4-5). As illustrated in FIGS. 1 and 4-5, line boring machine 50 additionally includes a spherical bearing mount assembly 70 at least partially supporting boring bar 60, a rotational drive unit (RDU) assembly 80 configured to rotate boring bar 60 about boring bar axis 62, and an axial feed unit (AFU) assembly 90 configured to translate boring bar 60 along boring bar axis 62. In particular, RDU assembly 80 is configured to revolve cutting tool 66 about boring bar axis 62, and AFU assembly 90 is configured to translate cutting tool 66 along a direction parallel to boring bar axis 62, thereby defining a tool path of cutting tool 66 to machine a surface of workpiece 10. As illustrated in more detail in FIGS. 2-3, spherical bearing mount assembly 70 includes a bearing mount body 72 and a spherical bearing assembly 100 operatively coupled to bearing mount body 72. Various aspects, components, and/or functionalities of line boring machines 50 that may utilize and/or incorporate spherical bearing assemblies 100 according to the present disclosure are disclosed in U.S. Pat. No. 5,642,969, the complete disclosure of which is hereby incorporated by reference.

Cutting tool 66 may be configured to machine the surface of workpiece 10 in any of a variety of manners, such as by facing an exterior surface of workpiece 10 and/or by machining a bore 12 of workpiece 10 (shown in FIGS. 4-5). To ensure that cutting tool 66 follows a stable and/or predetermined tool path, it generally is desirable that spherical bearing mount assembly 70 supports boring bar 60 in such a manner that boring bar axis 62 remains nominally fully fixed in position and/or orientation during operative use of line boring machine 50. In particular, and as discussed in more detail herein, spherical bearing mount assembly 70 may be described as engaging boring bar 60 across at least a portion of a circumference thereof in a manner that is sufficiently secure to ensure that boring bar axis 62 is nominally fixed relative to spherical bearing mount assembly 70. However, because spherical bearing mount assembly 70 generally remains fixed relative to workpiece 10 during operative use of line boring machine 50, it also is desirable that spherical bearing mount assembly 70 engages boring bar 60 sufficiently loose that boring bar 60 is free to rotate under the power of RDU assembly 80 and/or to translate axially under the power of AFU assembly 90. Stated differently, spherical bearing mount assembly 70 may be configured to support boring bar 60 such that boring bar 60 is free to translate relative to spherical bearing assembly 100 along boring bar axis 62 and to rotate relative to spherical bearing assembly 100 about boring bar axis 62 while restricting boring bar 60 from translating relative to spherical bearing assembly along a direction perpendicular to boring bar axis 62.

In some prior art examples, preparing line boring machine 50 for operative use to machine workpiece 10 includes tightening an engagement between spherical bearing mount assembly 70 and boring bar 60 to a tightness that balances the aforementioned considerations and/or subsequently locking the configuration of spherical bearing mount assembly 70, such as with a nut. However, in such examples, the operative use of line boring machine 50 to machine workpiece 10 may produce vibrations that result in a gradual loosening of the engagement between spherical bearing mount assembly 70 and boring bar 60, potentially introducing instability and/or imprecision to the tool path followed by cutting tool 66. By contrast, and as described in more detail herein, spherical bearing assemblies 100 according to the present disclosure are configured to engage boring bar 60 with a tightness of engagement that is restricted from varying during operative use of line boring machine 50.

While the present disclosure generally relates to examples in which spherical bearing assembly 100 and/or spherical bearing mount assembly 70 is utilized in conjunction with line boring machine 50, this is not required of all examples of spherical bearing assembly 100. For example, it additionally is within the scope of the present disclosure that spherical bearing assembly 100 and/or spherical bearing mount assembly 70 may be utilized in conjunction with any of a variety of machine tools.

Figure 2:
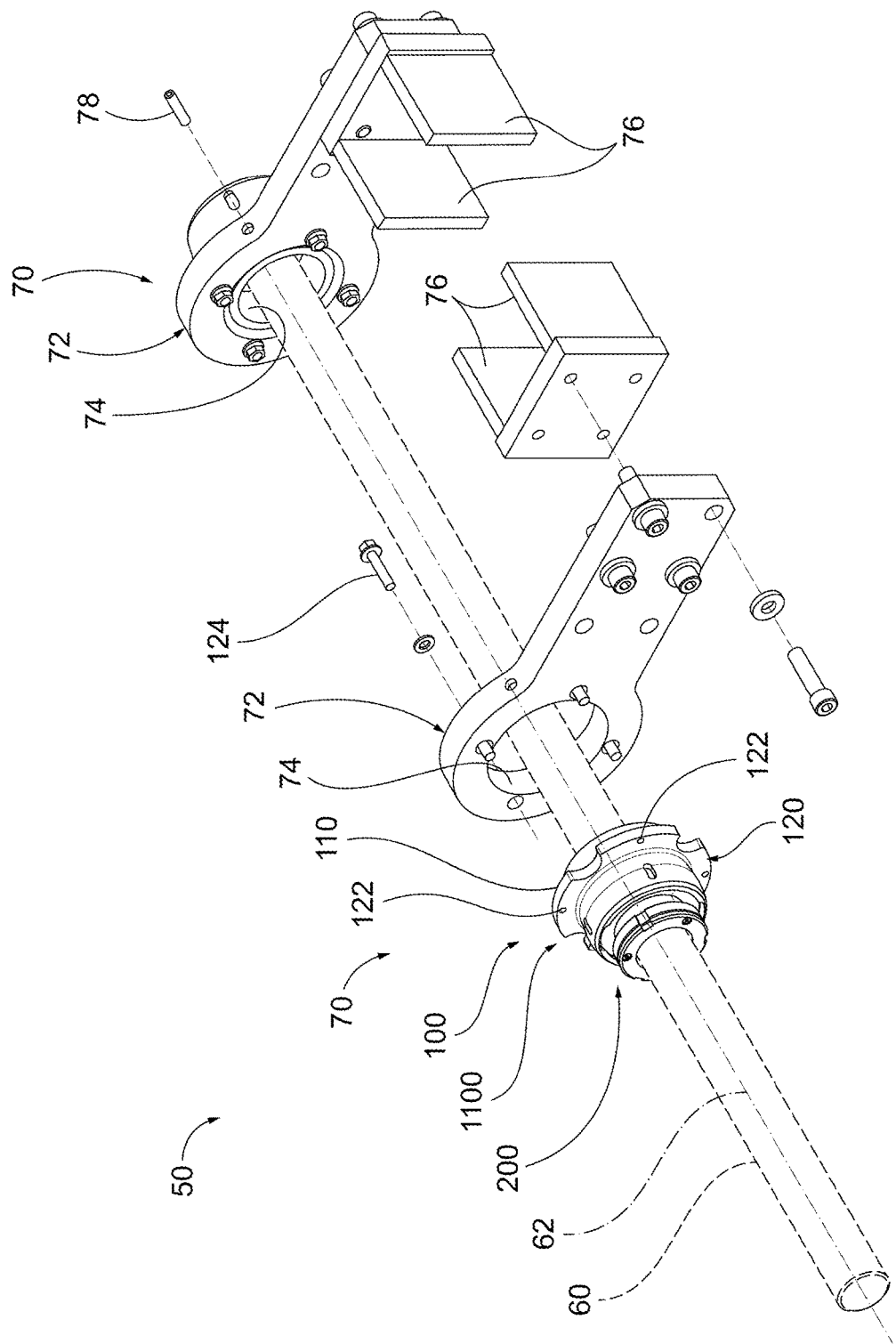
FIG. 2 is an exploded top front side isometric view of an example of a boring bar and a pair of examples of spherical bearing mount assemblies according to the present disclosure.
Figure 6:
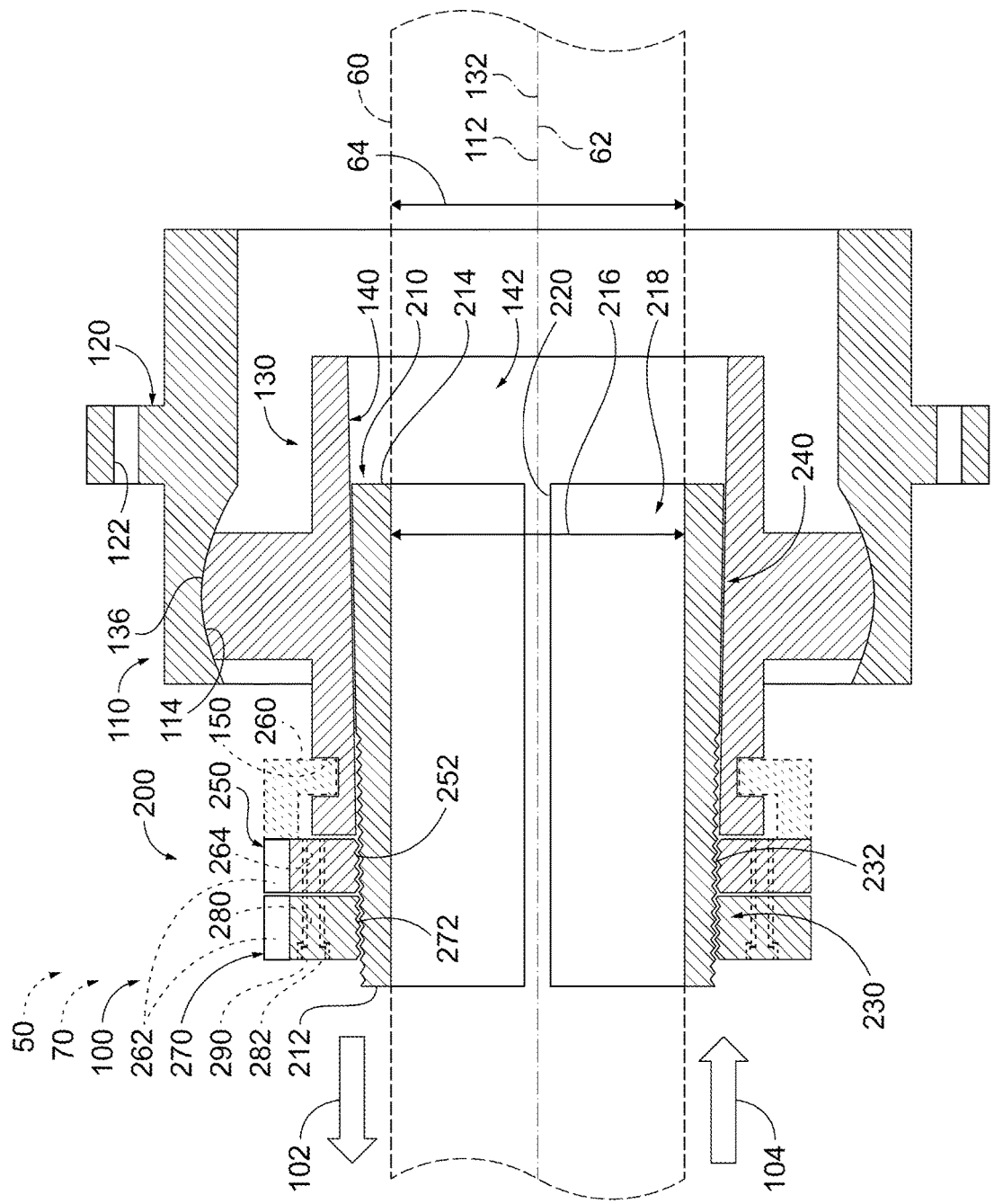
FIG. 6 is a schematic cross-sectional side elevation view representing examples of spherical bearing assemblies according to the present disclosure.
Figure 7:
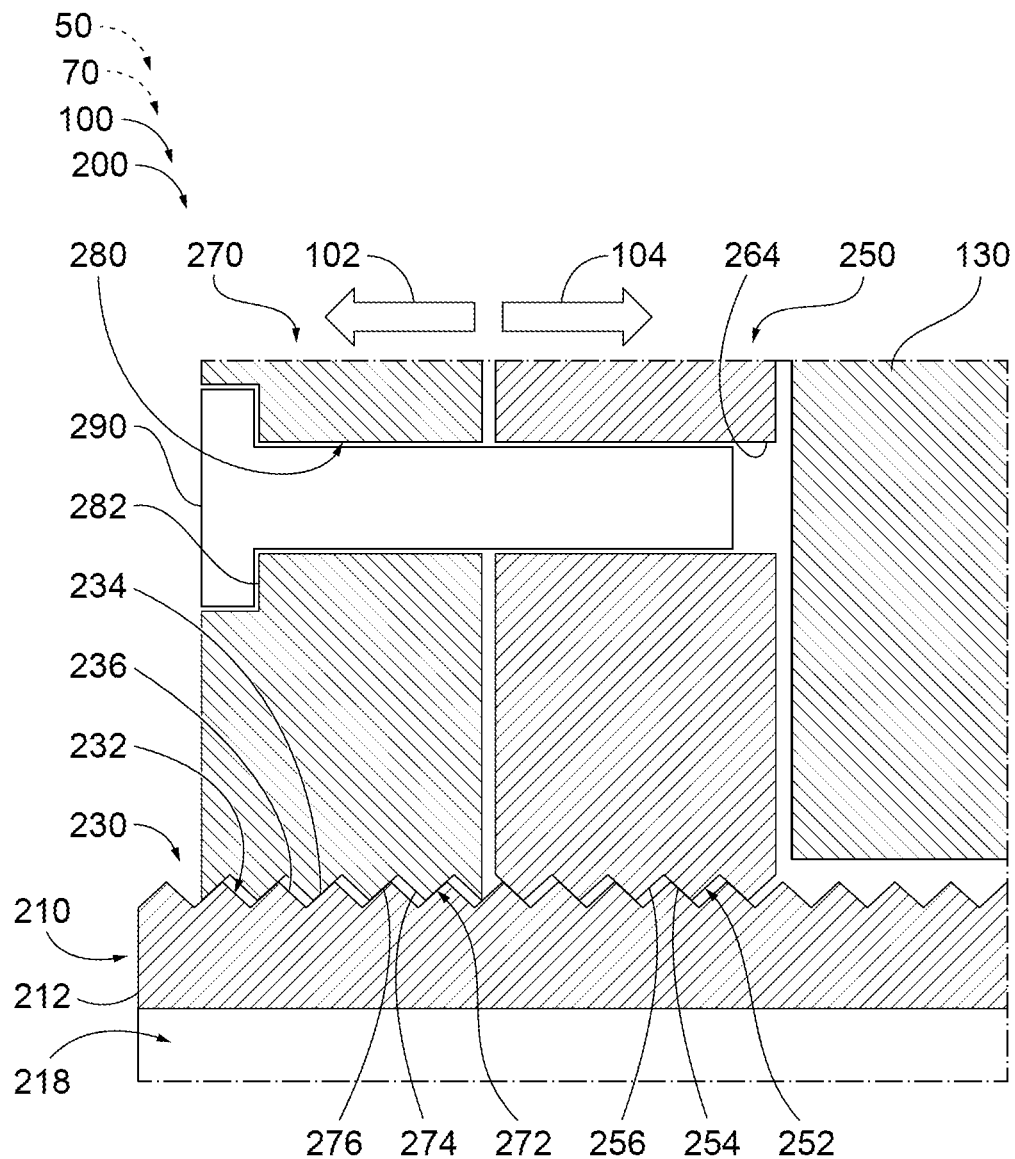
FIG. 7 is a schematic cross-sectional cutaway side elevation view representing an example of a locking bearing adapter including a locking screw according to the present disclosure.
Figure 8:
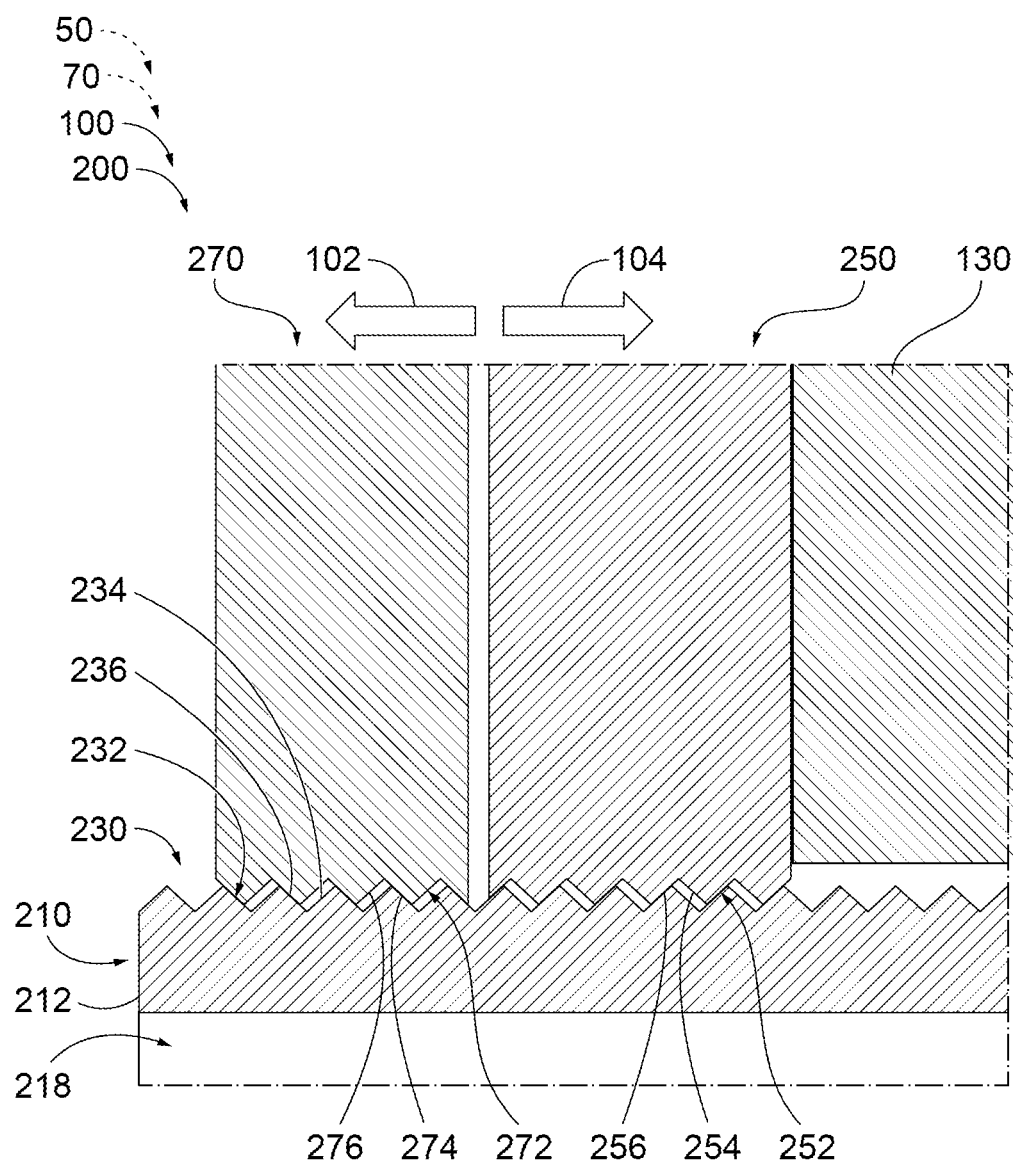
FIG. 8 is a schematic cross-sectional cutaway side elevation view representing an example of a locking bearing adapter with an exterior nut directly engaging an interior nut according to the present disclosure.
Figure 9:
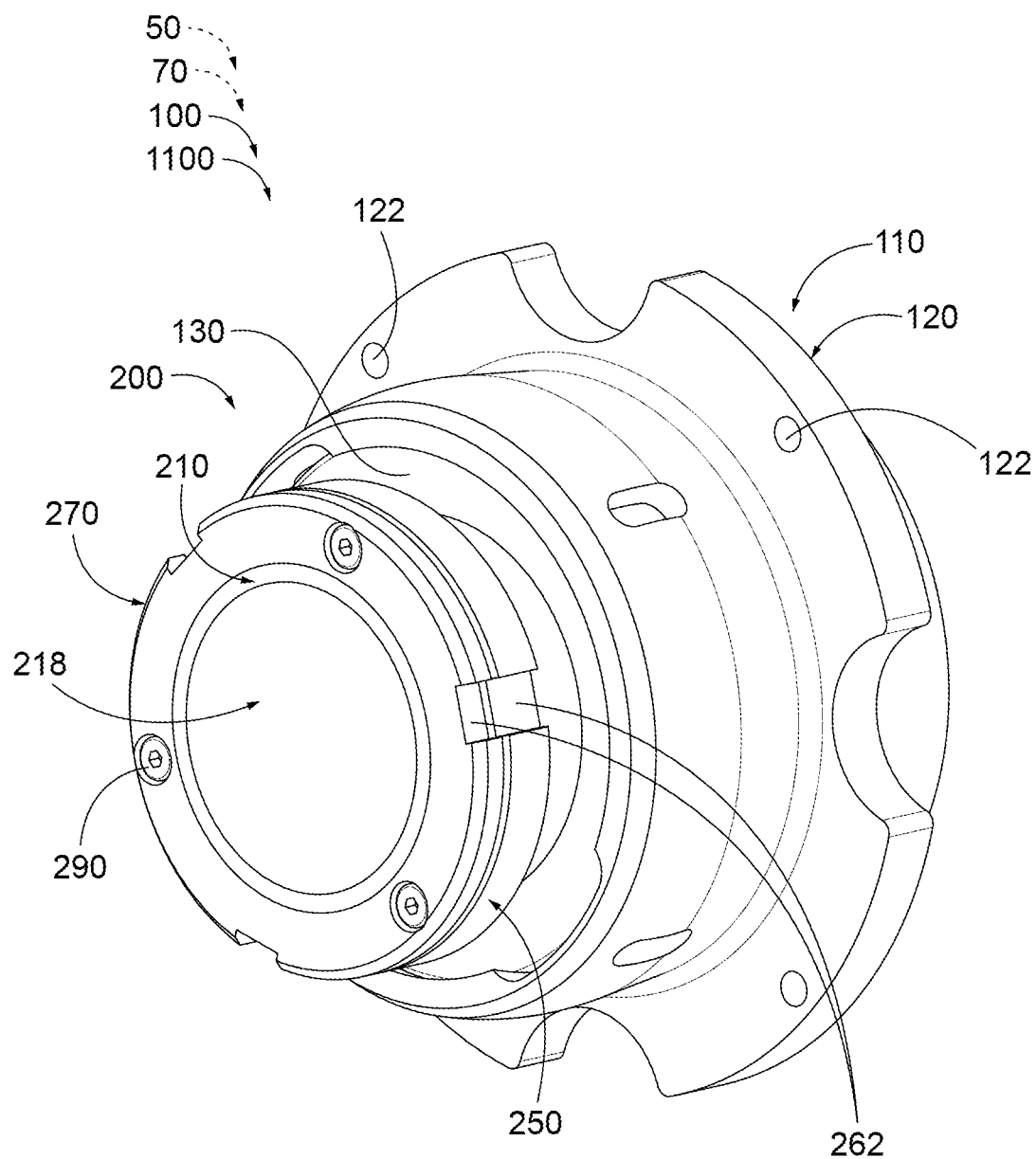
FIG. 9 is a top front side isometric view of an example of a spherical bearing assembly according to the present disclosure.
Figure 10:
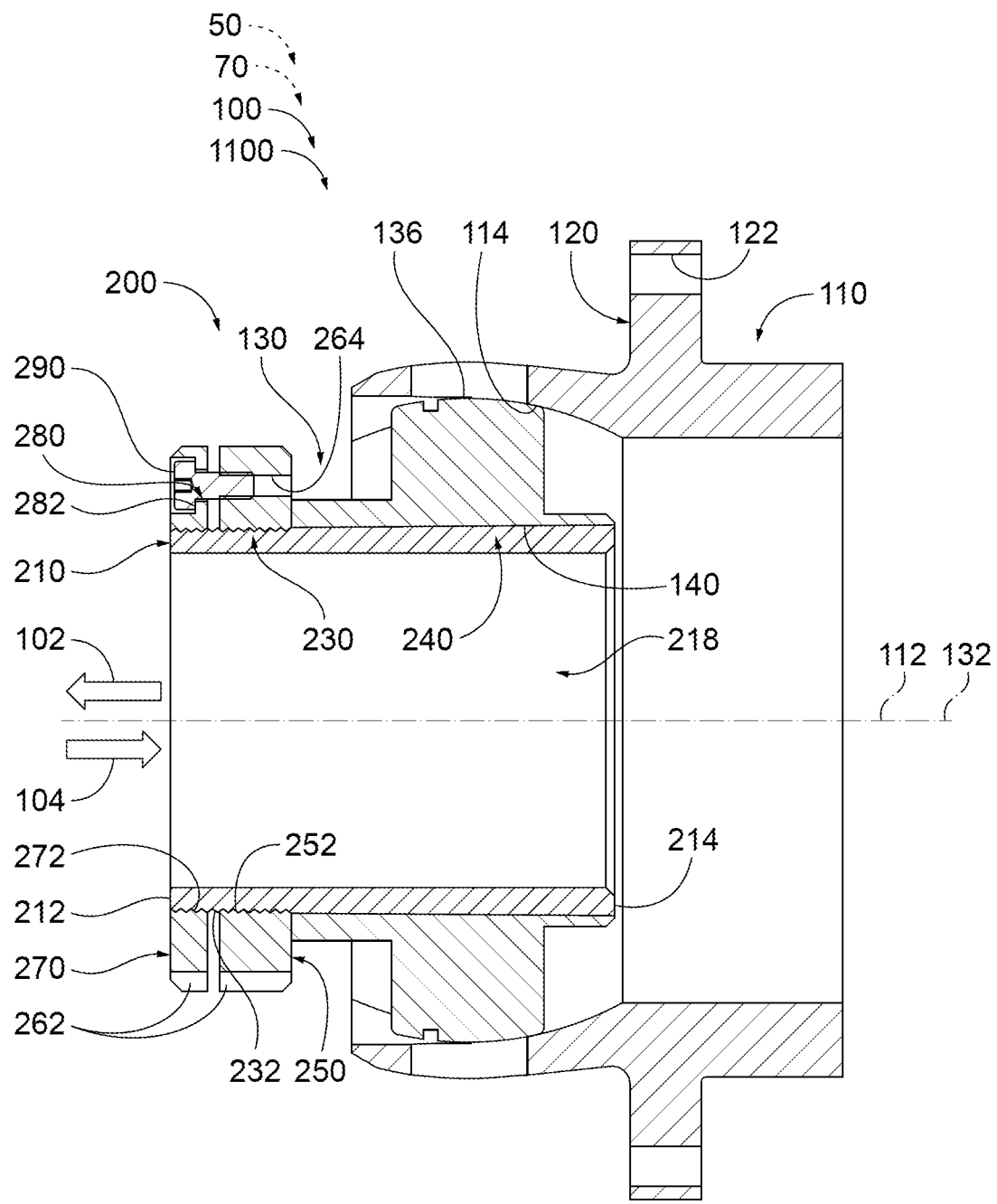
FIG. 10 is a cross-sectional side elevation view of the spherical bearing assembly of FIG. 9.

FIG. 6 schematically illustrates examples of spherical bearing assembly 100 in cross-section, while FIGS. 7-8 are cross-sectional views of portions of more specific examples of spherical bearing assembly 100. FIGS. 9-10 are less schematic illustrations of an example spherical bearing assembly 1100, which is an example of spherical bearing assembly 100, and which is illustrated in FIGS. 2-3 in conjunction with aspects of line boring machine 50.

As schematically illustrated in FIG. 6 and less schematically illustrated in FIGS. 9-10, spherical bearing assembly 100 includes an outer ring 110 configured to be operatively coupled to bearing mount body 72 of spherical bearing mount assembly 70 (as illustrated in the exploded views of FIGS. 2-3), as well as an adjustable receiver 130 operatively coupled to outer ring 110 and at least partially received within outer ring 110. As schematically illustrated in FIG. 6, adjustable receiver 130 includes an adjustable receiver inner surface 140 that defines an adjustable receiver bore 142 and that is tapered toward an outboard direction 102. While FIGS. 6 and 10 illustrate adjustable receiver 130 as being a single unitary and/or monolithic component, this is not required of all examples of spherical bearing assembly 100. For example, it additionally is within the scope of the present disclosure that adjustable receiver 130 may refer to any collection of components that collectively engage, and/or are operatively coupled to, outer ring 110, tapered sleeve 210, and interior nut 250, as described herein.

As schematically illustrated in FIG. 6 and less schematically illustrated in FIGS. 9-10, spherical bearing assembly 100 further includes a locking bearing adapter 200 configured to operatively couple adjustable receiver 130 to boring bar 60. As schematically illustrated in FIG. 6 and less schematically illustrated in FIGS. 9-10, locking bearing adapter 200 includes a tapered sleeve 210 partially received within adjustable receiver bore 142, an interior nut 250 threadingly coupled to tapered sleeve 210 and configured to engage adjustable receiver 130, and an exterior nut 270 threadingly coupled to tapered sleeve 210 and positioned adjacent to interior nut 250 such that interior nut 250 is positioned between exterior nut 270 and adjustable receiver 130. Various aspects, components, and/or functionalities of spherical bearing assembly 100, of adjustable receiver 130, of tapered sleeve 210, and/or of interior nut 250 according to the present disclosure are disclosed in U.S. Pat. No. 6,939,053, the complete disclosure of which is hereby incorporated by reference.

As schematically illustrated in FIG. 6, tapered sleeve 210 is tapered toward outboard direction 102 in a similar manner as adjustable receiver inner surface 140. Additionally, tapered sleeve 210 includes a sleeve bore 218 with a sleeve inner diameter 216 and configured to receive and/or engage boring bar 60, as well as a split seam 220 configured to enable tapered sleeve 210 to radially expand and contract. In particular, in some examples, and as schematically illustrated in FIG. 6, split seam 220 extends along a full length of tapered sleeve 210 to permit tapered sleeve 210 to radially contract to reach a configuration in which sleeve inner diameter 216 is appropriately dimensioned such that tapered sleeve 210 engages boring bar 60 with a desired tightness. In other examples, split seam 220 may extend along only a portion of a length of tapered sleeve 210, and/or tapered sleeve 210 may include a plurality of split seams 220 in the manner of a collet.

As described in more detail herein, exterior nut 270 is configured to be operatively coupled to interior nut 250 such that interior nut 250 and exterior nut 270 are locked in position relative to tapered sleeve 210, thereby restricting sleeve inner diameter 216 from varying during operative use of spherical bearing assembly 100 and/or line boring machine 50. As schematically illustrated in FIG. 6, adjustable receiver inner surface 140 and an exterior surface of tapered sleeve 210 engage one another such that sleeve inner diameter 216 is at least partially based upon an axial position of tapered sleeve 210 relative to adjustable receiver 130. In particular, and with reference to FIG. 6, when tapered sleeve 210 translates relative to adjustable receiver 130 along outboard direction 102, engagement between tapered sleeve 210 and adjustable receiver inner surface 140 urges tapered sleeve 210 to decrease in diameter, thus tightening an engagement between tapered sleeve 210 and boring bar 60. Such translation of tapered sleeve 210 relative to adjustable receiver 130 may be produced via adjustment of interior nut 250. Specifically, in some examples, interior nut 250 is threaded onto tapered sleeve 210 such that tightening interior nut 250 against adjustable receiver 130 urges tapered sleeve 210 to translate in outboard direction 102 and against adjustable receiver inner surface 140, thereby radially contracting tapered sleeve 210 to bring sleeve inner diameter 216 to a target inner diameter. Once interior nut 250 is suitably adjusted while engaging adjustable receiver 130 to bring sleeve inner diameter 216 to the target inner diameter, threading exterior nut 270 onto tapered sleeve 210 and operatively coupling exterior nut 270 and interior nut 250 to one another operates to lock interior nut 250 and exterior nut 270 in position relative to tapered sleeve 210, thus effectively locking sleeve inner diameter 216 at the target inner diameter.

In some examples, and as schematically illustrated in FIG. 6, the target inner diameter of tapered sleeve 210 corresponds to a boring bar diameter 64 of boring bar 60. For example, the target inner diameter may be nominally equal to boring bar diameter 64, and/or may be slightly larger than boring bar diameter 64. As a more specific example, the target inner diameter may exceed boring bar diameter 64 by a degree that is sufficiently large to permit boring bar 60 to axially translate and/or to rotate relative to adjustable receiver 130 and that is sufficiently small to restrict boring bar 60 from translating relative to adjustable receiver 130 along a direction perpendicular to boring bar axis 62.

As used herein, the term "operatively coupled," as used to describe a configuration of interior nut 250 and exterior nut 270 relative to one another, may be used to describe any configuration in which interior nut 250 and exterior nut 270 are in direct engagement, or in which interior nut 250 and exterior nut 270 are connected to one another via one or more structures (other than tapered sleeve 210) that at least partially restrict interior nut 250 and exterior nut 270 from translating and/or rotating relative to one another.

The operation of interior nut 250 and exterior nut 270 to operatively lock tapered sleeve 210 relative to adjustable receiver 130 may be understood with reference to the threaded engagement between such components. In particular, in some examples, and as schematically illustrated in FIG. 6, tapered sleeve 210 includes a tapered sleeve thread 232, and interior nut 250 includes an interior nut thread 252 that threadingly engages tapered sleeve thread 232. Similarly, in such examples, exterior nut 270 includes an exterior nut thread 272 that threadingly engages tapered sleeve thread 233. In this manner, an axial position of each of interior nut 250 and exterior nut 270 relative to tapered sleeve 210 may be selectively adjusted by screwing each of interior nut 250 and exterior nut 270 onto tapered sleeve 210. As used herein, the term "screwing," as used to describe an operation upon a nut such as interior nut 250 or exterior nut 270 upon tapered sleeve 210, is intended to refer to an operation in which the nut is selectively rotated about tapered sleeve 210 while threadingly engaging tapered sleeve 210 to advance the nut along the tapered sleeve along outboard direction 102 or along an inboard direction 104 (schematically illustrated in FIG. 6) that is opposite outboard direction 102.

Each of interior nut 250 and exterior nut 270 may include any of a variety of external features configured to facilitate screwing the nut upon tapered sleeve 210, such as with a tool. In particular, in some examples, and as schematically illustrated in FIG. 6 and less schematically illustrated in FIGS. 9-10, interior nut 250 and/or exterior nut 270 includes one or more tool recesses 262 configured to be engaged by a tool to selectively tighten and/or loosen the nut upon tapered sleeve 210.

In some examples, tapered sleeve thread 232 is defined on a portion of an exterior surface of tapered sleeve 210. For example, and as schematically illustrated in FIG. 6 and less schematically illustrated in FIGS. 9-10, tapered sleeve 210 may be described as having a tapered sleeve first end 212 and a tapered sleeve second end 214 that is spaced apart from tapered sleeve first end 212 along inboard direction 104. In some such examples, tapered sleeve 210 includes a threaded region 230 that includes and/or defines tapered sleeve thread 232 positioned proximate to tapered sleeve first end 212, as well as an unthreaded region 240 that engages adjustable receiver inner surface 140 and that is positioned proximate to tapered sleeve second end 214.

In some examples, exterior nut 270 is configured to be operatively coupled to interior nut 250 such that exterior nut 270 and interior nut 250 are biased toward one another. In some such examples, and as schematically illustrated in FIGS. 6-7, locking bearing adapter 200 includes a plurality of locking screws 290 that are configured to engage each of exterior nut 270 and interior nut 250 to operatively couple exterior nut 270 and interior nut 250 to one another. In such examples, and as schematically illustrated in FIGS. 6-7, exterior nut 270 may define a plurality of exterior nut fastener receivers 280 such that each locking screw 290 extends through a respective exterior nut fastener receiver 280 and engages interior nut 250. More specifically, in some such examples, and as schematically illustrated in FIGS. 6-7, interior nut 250 defines a plurality of interior nut fastener receivers 264 such that each locking screw 290 is at least partially received within a respective interior nut fastener receiver 264 when exterior nut 270 is operatively coupled to interior nut 250. In such examples, each locking screw 290 may engage interior nut 250 via the respective interior nut fastener receiver 264 such that the plurality of locking screws 290 collectively operate to bias exterior nut 270 and interior nut 250 toward one another. More specifically, in some such examples, each locking screw 290 is configured to bear against a surface of exterior nut 270, such as a countersink 282 of the respective exterior nut fastener receiver 280 (as illustrated in FIGS. 6-7), while threadingly engaging the respective interior nut fastener receiver 264 to bias exterior nut 270 and interior nut 250 toward one another.

The operation of the plurality of locking screws 290 to operatively couple exterior nut 270 and interior nut 250 to one another may be understood with reference to FIG. 7. As schematically illustrated in FIG. 7, interior nut thread 252 may be described as including an interior nut thread outboard flank 254 that is directed toward outboard direction 102 and an interior nut thread inboard flank 256 that is directed toward inboard direction 104. Similarly, exterior nut thread 272 may be described as including an exterior nut thread outboard flank 274 that is directed toward outboard direction 102 and an exterior nut thread inboard flank 276 that is directed toward inboard direction 104. Similarly, tapered sleeve thread 232 may be described as including a tapered sleeve thread outboard flank 234 that is directed toward outboard direction 102 and a tapered sleeve thread inboard flank 236 that is directed toward inboard direction 104.

When interior nut 250 is threaded onto tapered sleeve 210 and screwed against adjustable receiver 130, tapered sleeve thread 232 engages interior nut thread 252 to bias interior nut 250 toward inboard direction 104 and toward adjustable receiver 130. In particular, and as schematically illustrated in FIG. 7, interior nut thread outboard flank 254 bears against tapered sleeve thread inboard flank 236 to exert this biasing force upon interior nut 250. When exterior nut 270 subsequently is operatively coupled to interior nut 250 via the plurality of locking screws 290 that are tightened to bias exterior nut 270 and interior nut 250 toward one another, interior nut thread outboard flank 254 continues bearing against tapered sleeve thread inboard flank 236, while exterior nut thread inboard flank 276 bears against tapered sleeve thread outboard flank 234. In this manner, operatively coupling exterior nut 270 to interior nut 250 in a manner that biases exterior nut 270 and interior nut 250 toward one another may ensure that engagement between interior nut thread 252 and tapered sleeve thread 232 does not shift or otherwise vary in a manner that could result in a shifting of tapered sleeve 210 relative to adjustable receiver 130. Stated differently, operatively coupling exterior nut 270 to interior nut 250 in a manner that biases exterior nut 270 and interior nut 250 toward one another may facilitate ensuring that a fit and/or tightness of tapered sleeve 210 upon boring bar 60 is nominally unaffected by operatively coupling exterior nut 270 and interior nut 250 to one another. However, in such examples, operatively coupling exterior nut 270 and interior nut 250 to one another still may operate to lock exterior nut 270 and/or interior nut 250 from shifting and/or rotating relative to tapered sleeve 210, which in turn may ensure that sleeve inner diameter 216 remains nominally constant during operative use of line boring machine 50.

In other examples, locking bearing adapter 200 may be configured such that, during operative use of spherical bearing assembly 100, exterior nut 270 and interior nut 250 are operatively coupled to one another such that exterior nut 270 and interior nut 250 are biased away from one another. An example of such a configuration is schematically illustrated in FIG. 8. In particular, in the example of FIG. 8, locking bearing adapter 200 is configured such that exterior nut 270 and interior nut 250 are operatively coupled to one another by threading exterior nut 270 onto tapered sleeve 210 such that exterior nut 270 directly engages interior nut 250. In such an example, when exterior nut 270 and interior nut 250 are operatively coupled to one another, exterior nut 270 may exert a force on interior nut 250 along inboard direction 104, while interior nut 250 may exert a force on exterior nut 270 along outboard direction 102. Accordingly, in such examples, and a schematically illustrated in FIG. 8, interior nut thread inboard flank 256 may bear against tapered sleeve thread outboard flank 234, and exterior nut thread outboard flank 274 may bear against tapered sleeve thread inboard flank 236. In this manner, in such a configuration, operatively coupling exterior nut 270 to interior nut 250 may operate to shift the axial load exerted by tapered sleeve 210 in inboard direction 104 from being borne by interior nut 250 to being borne by exterior nut 270. In such a configuration, interior nut 250 may be described as operating as a jam nut. In such a configuration, exterior nut 270 and interior nut 250 may be described as being biased away from one another via the forces directly exerted on one another via the operatively coupling thereof even though engagement of each nut with tapered sleeve thread 232 operates to bias exterior nut 270 and interior nut 250 toward one another with equal magnitude.

In other examples, the plurality of locking screws 290 alternatively may be utilized to operatively couple exterior nut 270 and interior nut 250 to one another such that exterior nut 270 and interior nut 250 are biased away from one another. For example, each locking screw 290 may be threadingly coupled to the respective exterior nut fastener receiver 280 and may bear against an external surface of interior nut 250 to bias exterior nut 270 and interior nut 250 away from one another. In such examples, each locking screw 290 additionally or alternatively may be described as a standoff screw 290.

Interior nut 250 may be configured to engage adjustable receiver 130 and/or to be operatively coupled to adjustable receiver 130 in any of a variety of manners. For example, interior nut 250 and/or adjustable receiver 130 may be configured to at least partially restrict interior nut 250 from being removed from adjustable receiver 130. In particular, in some examples, and as schematically illustrated in FIG. 6, interior nut 250 includes a captive nut collar 260, and adjustable receiver 130 includes a captive nut receiver 150 that receives at least a portion of captive nut collar 260. In this manner, engagement between captive nut receiver 150 and captive nut collar 260 may at least partially restrict interior nut 250 from translating axially relative to adjustable receiver 130 (such as in outboard direction 102) during operative use of spherical bearing assembly 100.

In some examples, spherical bearing assembly 100 includes one or more features for operatively coupling spherical bearing assembly 100 to one or more other components of line boring machine 50, such as bearing mount body 72 of spherical bearing mount assembly 70. For example, and as schematically illustrated in FIG. 6 and less schematically illustrated in FIGS. 2-3 and 9-10, outer ring 110 may include a mounting flange 120 that is configured to operatively couple spherical bearing assembly 100 to bearing mount body 72 of spherical bearing mount assembly 70 (shown in FIGS. 2-3). More specifically, in some such examples, and as schematically illustrated in FIG. 6 and less schematically illustrated in FIGS. 2-3 and 9-10, mounting flange 120 defines a plurality of mounting fastener receivers 122, each configured to receive a respective mounting fastener 124 (shown in FIGS. 2-3) to operatively couple spherical bearing assembly 100 to bearing mount body 72.

In some examples, adjustable receiver 130 is operatively coupled to outer ring 110 such that an orientation of adjustable receiver 130 relative to outer ring 110 is adjustable, such as to adjust an orientation of boring bar axis 62 when spherical bearing assembly 100 is operatively coupled to bearing mount body 72 of spherical bearing mount assembly 70. In particular, in some examples, and as schematically illustrated in FIG. 6 and less schematically illustrated in FIG. 10, outer ring 110 includes an internal spherical bearing surface 114, and adjustable receiver 130 includes an external spherical bearing surface 136 that operatively and adjustably engages internal spherical bearing surface 114. In particular, in such examples, external spherical bearing surface 136 engages internal spherical bearing surface 114 such that a rotational orientation of adjustable receiver 130 relative to outer ring 110 is selectively adjustable. More specifically, and as schematically illustrated in FIG. 6 and less schematically illustrated in FIG. 10, outer ring 110 may be described as defining an outer ring central axis 112, and adjustable receiver may be described as defining an adjustable receiver central axis 132 that is not necessarily parallel to outer ring central axis 112 during operative use of spherical bearing assembly 100. In such examples, spherical bearing assembly 100 may be configured such that internal spherical bearing surface 114 and exterior spherical bearing surface 136 operatively engage one another while outer ring central axis 112 and adjustable receiver central axis 132 are angled relative to one another by an adjustable receiver offset angle. As examples, the adjustable receiver offset angle may be at least 0 degrees, at least 3 degrees, at least 5 degrees, at most 10 degrees, at most 7 degrees, and/or at most 2 degrees. In some examples, spherical bearing assembly 100 may be configured such that, when boring bar 60 is received within tapered sleeve 210 during operative use of spherical bearing assembly 100, boring bar axis 62 is nominally fully parallel to, and/or collinear with, adjustable receiver central axis 132.

In some examples, each of internal spherical bearing surface 114 and external spherical bearing surface 136 is at least partially spherical in shape. Stated differently, in such examples, each of internal spherical bearing surface 114 and external spherical bearing surface 136 may have the shape of a portion of a sphere. Internal spherical bearing surface 114 and external spherical bearing surface 136 may engage one another in any of a variety of manners. In some examples, internal spherical bearing surface 114 and external spherical bearing surface 136 directly engage one another to form a plain bearing. In other examples, one or both of internal spherical bearing surface 114 and external spherical bearing surface 136 includes one or more rolling bearing elements, such as ball bearings.

Returning to FIGS. 1-5, line boring machine 50 may incorporate spherical bearing assembly 100 in any suitable manner. For example, and as illustrated in FIGS. 1 and 4-5, RDU assembly 80 may be operatively coupled to spherical bearing assembly 100, such as to outer ring 110. In particular, and as illustrated in FIGS. 1 and 4-5, RDU assembly 80 may include an RDU clamp collar 82 that is configured to selectively engage spherical bearing assembly 100 and/or outer ring 110 thereof to operatively couple RDU assembly 80 to spherical bearing assembly 100.

Spherical bearing mount assembly 70 may be configured to be positioned and/or secured relative to workpiece 10 in any of a variety of manners. For example, bearing mount body 72 may be configured to be fixed relative to workpiece 10 and/or fixedly coupled to workpiece 10. In some examples, and as illustrated in FIGS. 1-5, spherical bearing mount assembly 70 includes one or more standoff plates 76 operatively coupled to bearing mount body 72 and configured to be fixedly coupled (e.g., welded) to workpiece 10 (shown in FIGS. 4-5) and/or to a structure that is fixed relative to workpiece 10.

In some examples, and as illustrated in FIGS. 2-3, bearing mount body 72 includes a spherical bearing receiver 74 such that outer ring 110 is at least partially received within spherical bearing receiver 74 during operative use of line boring machine 50. In some such examples, spherical bearing mount assembly 70 additionally includes one or more features or components for adjusting a position of spherical bearing assembly 100 relative to bearing mount body 72. For example, and as illustrated in FIGS. 2-3, spherical bearing mount assembly 70 additionally includes one or more jacking screws 78 operatively coupled to bearing mount body 72 and to spherical bearing assembly 100. In such examples, jacking screws 78 may be configured to adjust a position of spherical bearing assembly 100 within spherical bearing receiver 74, such as to fine-tune a position of outer ring central axis 112, of adjustable receiver central axis 132, and/or of boring bar axis 62 relative to bearing mount body 72.

Figure 11:
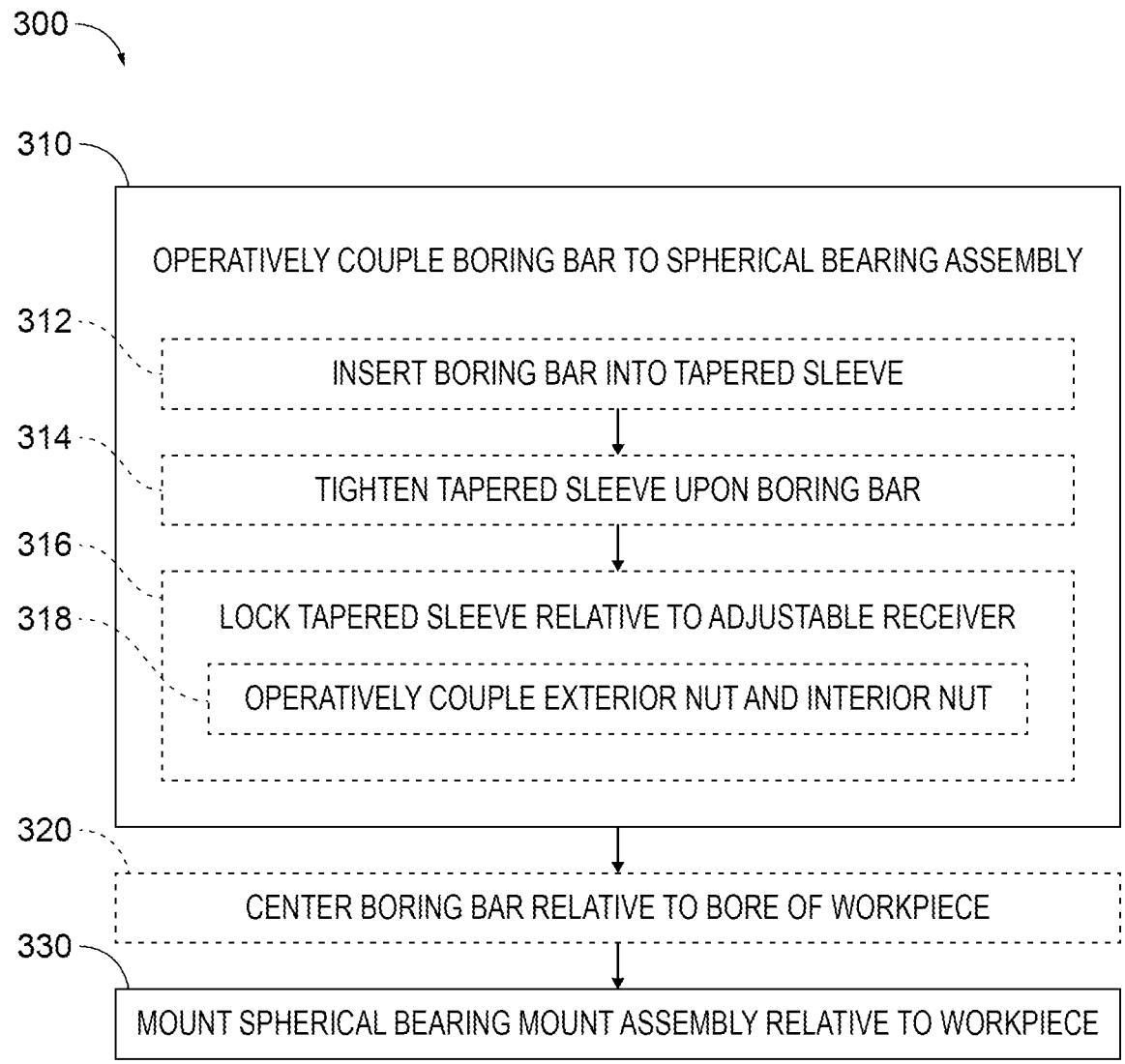
FIG. 11 is a flowchart depicting examples of methods of utilizing a line boring machine according to the present disclosure.

FIG. 11 is a flowchart depicting examples of methods 300, according to the present disclosure, of utilizing a line boring machine, such as line boring machine 50 disclosed herein. As shown in FIG. 11, a method 300 includes operatively coupling, at 310, a boring bar of the line boring machine to a spherical bearing assembly of the line boring machine and mounting, at 330, a spherical bearing mount assembly of the line boring machine relative to a workpiece. Examples of boring bars, spherical bearing mount assemblies, spherical bearing assemblies, and/or workpieces that may be utilized in conjunction with methods 300 are disclosed herein with reference to boring bar 60, spherical bearing mount assembly 70, spherical bearing assembly 100, and/or workpiece 10, respectively.

In some examples, and as shown in FIG. 11, the operatively coupling the boring bar to the spherical bearing assembly at 310 includes inserting, at 312, the boring bar into a tapered sleeve (such as tapered sleeve 210 disclosed herein); tightening, at 314, the tapered sleeve upon the boring bar; and locking, at 316, the tapered sleeve relative to an adjustable receiver (such as adjustable receiver 130 disclosed herein).

The tightening the tapered sleeve upon the boring bar at 314 may be performed in any of a variety of manners. In particular, in various examples, the tightening the tapered sleeve upon the boring bar at 314 includes tightening such that the boring bar is free to translate relative to the adjustable receiver along a boring bar axis (such as boring bar axis 62 disclosed herein) and to rotate relative to the adjustable receiver about the boring bar axis, while restricting the boring bar from translating relative to the adjustable receiver along a direction perpendicular to the boring bar axis. In particular, in some examples, the tightening the tapered sleeve upon the boring bar at 314 includes reducing a sleeve inner diameter of the tapered sleeve, such as sleeve inner diameter 216 disclosed herein. Additionally or alternatively, the tightening the tapered sleeve upon the boring bar at 314 may include screwing an interior nut of the spherical bearing assembly (such as interior nut 250 disclosed herein) against the adjustable receiver to translate the tapered sleeve in an outboard direction (such as outboard direction 102 referenced herein). In some such examples, and as discussed herein, the tightening the tapered sleeve upon the boring bar at 314 includes tightening such that an interior nut thread outboard flank of an interior nut thread of the interior nut bears against a tapered sleeve thread inboard flank of a tapered sleeve thread of the tapered sleeve. Examples of interior nut threads, interior nut thread outboard flanks, tapered sleeve threads, and/or tapered sleeve thread inboard flanks are disclosed herein with reference to interior nut thread 252, interior nut thread outboard flank 254, tapered sleeve thread 232, and/or tapered sleeve thread inboard flank 236, respectively.

In some examples, and as shown in FIG. 11, the locking the tapered sleeve relative to the adjustable receiver at 316 includes operatively coupling, at 318, an exterior nut of the spherical bearing assembly (such as exterior nut 270 disclosed herein) and the interior nut to one another. In some such examples, the operatively coupling the exterior nut and the interior nut to one another at 318 includes biasing the exterior nut and the interior nut toward one another. In particular, in some such examples in which the tightening the tapered sleeve upon the boring bar at 314 includes tightening such that the interior nut thread outboard flank bears against the tapered sleeve thread inboard flank, the operatively coupling the exterior nut and the interior nut to one another at 318 includes coupling such that the interior nut thread outboard flank continues bearing against the tapered sleeve thread inboard flank. Moreover, in such examples, the operatively coupling the exterior nut and the interior nut to one another at 318 may include coupling such that an exterior nut thread inboard flank of an exterior nut thread of the exterior nut bears against a tapered sleeve thread outboard flank of the tapered sleeve thread. Examples of exterior nut threads, exterior nut thread inboard flanks, and/or tapered sleeve thread outboard flanks that may be utilized in conjunction with methods 300 are disclosed herein with reference to exterior nut thread 272, exterior nut thread inboard flank 276, and/or tapered sleeve thread outboard flank 234, respectively.

In some examples, the operatively coupling the exterior nut and the interior nut to one another at 318 includes operatively coupling the exterior nut and the interior nut to one another with a plurality of locking screws, such as locking screws 290 disclosed herein. In particular, in some such examples, the operatively coupling the exterior nut and the interior nut to one another at 318 includes threading the exterior nut onto the tapered sleeve such that a plurality of exterior nut fastener receivers are aligned with a plurality of interior nut fastener receivers, inserting each locking screw into a respective exterior nut fastener and a respective interior nut fastener, and tightening each locking screw such that the exterior nut and the interior nut are biased toward one another. Examples of exterior nut fastener receivers and/or interior nut fastener receivers that may be utilized in conjunction with methods 300 are disclosed herein with reference to exterior nut fastener receiver 280 and/or interior nut fastener receiver 264, respectively. Alternatively, the operatively coupling the exterior nut and the interior nut to one another at 318 may include operatively coupling such that the exterior nut and the interior nut are biased apart from one another. For example, each exterior nut fastener may be threaded, and the operatively coupling the exterior nut and the interior nut to one another at 318 may include screwing each locking screw through the respective exterior nut fastener receiver to engage the interior nut and to bias the exterior nut and the interior nut apart from one another.

In some examples, the operatively coupling the exterior nut and the interior nut to one another at 318 includes threading the exterior nut onto the tapered sleeve such that the exterior nut directly engages the interior nut. In such examples, the exterior nut may engage the interior nut such that the exterior nut exerts a force on the interior nut along the inboard direction and such that the interior nut exerts a force on the exterior nut along the outboard direction. In some such examples, and when the tightening the tapered sleeve upon the boring bar at 314 includes tightening such that the interior nut thread outboard flank bears against the tapered sleeve thread inboard flank, the operatively coupling the exterior nut and the interior nut to one another at 318 includes coupling such that an interior nut thread inboard flank of the interior nut thread bears against the tapered sleeve thread outboard flank and such that the exterior nut thread outboard flank bears against the tapered sleeve thread inboard flank. Examples of interior nut thread inboard flanks that may be utilized in conjunction with methods 300 are disclosed herein with reference to interior nut thread inboard flank 256.

The mounting the spherical bearing mount assembly relative to the workpiece at 330 may be performed in any of a variety of manners. In some examples, the mounting the spherical bearing mount assembly relative to the workpiece at 330 includes mounting such that a bearing mount body of the spherical bearing mount assembly (such as bearing mount body 72 disclosed herein) is nominally fully fixed relative to the workpiece. Additionally or alternatively, the mounting the spherical bearing mount assembly relative to the workpiece at 330 may include welding one or more standoff plates, such as standoff plates 76 disclosed herein, to the workpiece and/or to a structure that is fixed relative to the workpiece.

In some examples, and as shown in FIG. 11, method 300 additionally includes centering, at 320, the boring bar relative to a bore of the workpiece, such as bore 12 disclosed herein. In such examples, the mounting the spherical bearing mount relative to the workpiece at 330 may be performed at least partially subsequent to the centering the boring bar at 320.

Additionally or alternatively, in some examples, method 300 additionally includes operatively coupling the spherical bearing assembly to the bearing mount body. In such examples, the operatively coupling the spherical bearing assembly to the bearing mount body may include positioning an outer ring of the spherical bearing mount at least partially within a spherical bearing receiver and operatively coupling a mounting flange of the outer ring to the bearing mount body via a plurality of mounting fasteners received within a plurality of mounting fastener receivers. Examples of spherical bearing receivers, mounting flanges, mounting fasteners, and/or mounting fastener receivers that may be utilized in conjunction with methods 300 are disclosed herein with reference to spherical bearing receiver 74, mounting flange 120, mounting fastener 124, and/or mounting fastener receiver 122, respectively. Additionally or alternatively, in some examples, the operatively coupling the spherical bearing assembly to the bearing mount body includes adjusting a position of the spherical bearing assembly relative to the bearing mount body with one or more jacking screws, such as jacking screws 78 disclosed herein.

Illustrative, non-exclusive examples of inventive subject matter according to the present disclosure are described in the following enumerated paragraphs. It is within the scope of the present disclosure that an individual step of a method recited herein, including in the following enumerated paragraphs, may additionally or alternatively be referred to as a "step for" performing the recited action.

A1. A spherical bearing assembly for a machine tool, the spherical bearing assembly comprising:
an outer ring configured to be operatively coupled to a bearing mount body of a spherical bearing mount assembly of the machine tool;
an adjustable receiver adjustably coupled to the outer ring and at least partially received within the outer ring; wherein the adjustable receiver includes an adjustable receiver inner surface that defines an adjustable receiver bore and that is tapered toward an outboard direction; and
a locking bearing adapter configured to operatively couple the adjustable receiver to a boring bar of the machine tool;
wherein the locking bearing adapter includes:
a tapered sleeve partially received within the adjustable receiver bore and tapered toward the outboard direction; wherein the tapered sleeve includes:
a sleeve bore with a sleeve inner diameter and configured to receive the boring bar; and
a split seam configured to enable the tapered sleeve to radially expand and contract to adjust the sleeve inner diameter, thereby to tighten the tapered sleeve upon the boring bar;
an interior nut threadingly coupled to the tapered sleeve and configured to engage the adjustable receiver; and
an exterior nut threadingly coupled to the tapered sleeve and positioned adjacent to the interior nut with the interior nut positioned between the exterior nut and the adjustable receiver; and
wherein the exterior nut and the interior nut are configured to be operatively coupled to one another such that the interior nut and the exterior nut are locked in position relative to the tapered sleeve to restrict the sleeve inner diameter from varying during operative use of the spherical bearing assembly.

A2. The spherical bearing assembly of paragraph A1, wherein, during operative use of the spherical bearing assembly, threading the interior nut onto the tapered sleeve and against the adjustable receiver urges the tapered sleeve to translate in the outboard direction and against the adjustable receiver inner surface, thereby to radially contract the tapered sleeve to bring the sleeve inner diameter to a target inner diameter; and
wherein, during operative use of the spherical bearing assembly with the interior nut threaded onto the tapered sleeve, with the interior nut engaging the adjustable receiver, and with the sleeve inner diameter being equal to the target inner diameter, threading the exterior nut onto the tapered sleeve and operatively coupling the exterior nut and the interior nut to one another operates to lock the interior nut and the exterior nut in position relative to the tapered sleeve.

A3. The spherical bearing assembly of paragraph A2, wherein the target inner diameter corresponds to a boring bar diameter of the boring bar; optionally wherein the target inner diameter is nominally equal to the boring bar diameter; optionally wherein the target inner diameter is larger than the boring bar diameter.

A4. The spherical bearing assembly of any of paragraphs A1-A3, wherein the outer ring includes an internal spherical bearing surface; and wherein the adjustable receiver includes an external spherical bearing surface that operatively and adjustably engages the internal spherical bearing surface such that a rotational orientation of the adjustable receiver relative to the outer ring is selectively adjustable while the external spherical bearing surface operatively engages the internal spherical bearing surface.

A5. The spherical bearing assembly of paragraph A4, wherein each of the internal spherical bearing surface and the external spherical bearing surface is at least partially spherical in shape.

A6. The spherical bearing assembly of any of paragraphs A4-A5, wherein the internal spherical bearing surface and the external spherical bearing surface directly engage one another to form a plain bearing.

A7. The spherical bearing assembly of any of paragraphs A4-A5, wherein one or both of the internal spherical bearing surface and the external spherical bearing surface includes one or more rolling bearing elements, optionally ball bearings.

A8. The spherical bearing assembly of any of paragraphs A4-A7, wherein the outer ring defines an outer ring central axis; wherein the adjustable receiver defines an adjustable receiver central axis; and wherein the spherical bearing assembly is configured such that the internal spherical bearing surface and the external spherical bearing surface operatively engage one another while an adjustable receiver offset angle measured between the adjustable receiver central axis and the outer ring central axis is one or more of at least 0 degrees, at least 3 degrees, at least 5 degrees, at most 10 degrees, at most 7 degrees, and at most 2 degrees.

A9. The spherical bearing assembly of any of paragraphs A1-A8, wherein the boring bar extends along a boring bar axis; and wherein the spherical bearing assembly is configured such that, when the boring bar is received within the tapered sleeve during operative use of the spherical bearing assembly, the boring bar axis is nominally fully parallel to an/the adjustable receiver central axis.

A10. The spherical bearing assembly of any of paragraphs A1-A9, wherein the outer ring includes a mounting flange configured to operatively couple the spherical bearing assembly to a/the bearing mount body of the machine tool.

A11. The spherical bearing assembly of paragraph A10, wherein the mounting flange defines a plurality of mounting fastener receivers, each configured to receive a respective mounting fastener of a plurality of mounting fasteners to operatively couple the spherical bearing assembly to the bearing mount body.

A12. The spherical bearing assembly of any of paragraphs A1-A11, wherein the interior nut includes a captive nut collar; and wherein the adjustable receiver includes a captive nut receiver that receives at least a portion of the captive nut collar to at least partially restrict the interior nut from translating axially relative to the adjustable receiver during operative use of the spherical bearing assembly.

A13. The spherical bearing assembly of any of paragraphs A1-A12, wherein one or both of the interior nut and the exterior nut includes one or more tool recesses configured to be engaged by a tool to selectively tighten and/or loosen the interior nut or the exterior nut upon the tapered sleeve.

A14. The spherical bearing assembly of any of paragraphs A1-A13, wherein the tapered sleeve includes a tapered sleeve thread; wherein the interior nut includes an interior nut thread that threadingly engages the tapered sleeve thread; and wherein the exterior nut includes an exterior nut thread that threadingly engages the tapered sleeve thread.

A15. The spherical bearing assembly of paragraph A14, wherein the tapered sleeve includes:
a tapered sleeve first end;
a tapered sleeve second end spaced apart from the tapered sleeve first end along an inboard direction that is opposite the outboard direction;
a threaded region including the tapered sleeve thread and positioned proximate to the tapered sleeve first end; and
an unthreaded region that engages the adjustable receiver inner surface and that is positioned proximate to the tapered sleeve second end.

A16. The spherical bearing assembly of any of paragraphs A1-A15, wherein the locking bearing adapter further includes a plurality of locking screws configured to engage each of the exterior nut and the interior nut to operatively couple the exterior nut and the interior nut to one another.

A17. The spherical bearing assembly of paragraph A16, wherein the exterior nut defines a plurality of exterior nut fastener receivers; and wherein each locking screw of the plurality of locking screws extends through a respective exterior nut fastener receiver of the plurality of exterior nut fastener receivers when the exterior nut is operatively coupled to the interior nut.

A18. The spherical bearing assembly of any of paragraphs A1-A17, wherein the locking bearing adapter is configured such that, during operative use of the spherical bearing assembly, the exterior nut is operatively coupled to the interior nut such that the exterior nut and the interior nut are biased toward one another.

A19. The spherical bearing assembly of paragraph A18, wherein the interior nut defines a plurality of interior nut fastener receivers; wherein each locking screw of a/the plurality of locking screws is at least partially received within a respective interior nut fastener receiver of the plurality of interior nut fastener receivers when the exterior nut is operatively coupled to the interior nut; and wherein each locking screw of a/the plurality of locking screws is configured to selectively bias the exterior nut and the interior nut toward one another.

A20. The spherical bearing assembly of paragraph A19, wherein each locking screw is configured to bear against a surface of the exterior nut and to threadingly engage the respective interior nut fastener receiver.

A21. The spherical bearing assembly of paragraph A20, wherein each exterior nut fastener receiver of a/the plurality of exterior nut fastener receivers includes a countersink; and wherein each locking screw is configured to bear against the countersink of the respective exterior nut fastener receiver.

A22. The spherical bearing assembly of any of paragraphs A18-A21, wherein the interior nut thread includes an interior nut thread outboard flank that is directed toward the outboard direction and an interior nut thread inboard flank that is directed toward an/the inboard direction; wherein the exterior nut thread includes an exterior nut thread outboard flank that is directed toward the outboard direction and an exterior nut thread inboard flank that is directed toward the inboard direction; wherein the tapered sleeve thread includes a tapered sleeve thread outboard flank that is directed toward the outboard direction and a tapered sleeve thread inboard flank that is directed toward the inboard direction; and wherein the locking bearing adapter is configured such that, during operative use of the spherical bearing assembly, the interior nut thread outboard flank bears against the tapered sleeve thread inboard flank and the exterior nut thread inboard flank bears against the tapered sleeve thread outboard flank.

A23. The spherical bearing assembly of any of paragraphs A1-A17, wherein the locking bearing adapter is configured such that, during operative use of the spherical bearing assembly, the exterior nut and the interior nut are operatively coupled to one another such that the exterior nut and the interior nut are biased away from one another.

A24. The spherical bearing assembly of paragraph A23, wherein the locking bearing adapter is configured such that, during operative use of the spherical bearing assembly, an/the interior nut thread inboard flank bears against a/the tapered sleeve thread outboard flank and an/the exterior nut thread outboard flank bears against a/the tapered sleeve thread inboard flank.

A25. The spherical bearing assembly of any of paragraphs A23-A24, wherein each locking screw of a/the plurality of locking screws is threadingly coupled to a/the respective exterior nut fastener receiver and bears against the interior nut to bias the exterior nut and the interior nut away from one another when the exterior nut is operatively couple to the interior nut.

A26. The spherical bearing assembly of any of paragraphs A23-A25, wherein the locking bearing adapter is configured such that, during operative use of the spherical bearing assembly and when the exterior and the interior nut are operatively coupled to one another, the exterior nut is threaded onto the tapered sleeve such that the exterior nut directly engages the interior nut.

A27. The spherical bearing assembly of paragraph A26, wherein the locking bearing adapter is configured such that, during operative use of the spherical bearing assembly, the exterior nut exerts a force on the interior nut along an/the inboard direction and the interior nut exerts a force on the exterior nut along the outboard direction.

A28. The spherical bearing assembly of any of paragraphs A26-A27, wherein the locking bearing adapter is configured such that, during operative use of the spherical bearing assembly, the interior nut operates as a jam nut.

A29. The spherical bearing assembly of any of paragraphs A1-A28, wherein the machine tool is a line boring machine.

A30. The spherical bearing assembly of any of paragraphs A1-A29 in combination with the machine tool.

B1. A line boring machine for machining a surface of a workpiece, the line boring machine comprising:
a boring bar extending along a boring bar axis;
a cutting tool operatively coupled to the boring bar for machining the surface of the workpiece;
a spherical bearing mount assembly at least partially supporting the boring bar;
a rotational drive unit (RDU) assembly configured to rotate the boring bar about the boring bar axis; and
an axial feed unit (AFU) assembly configured to translate the boring bar along the boring bar axis;
wherein the spherical bearing mount assembly includes:
a bearing mount body; and
a spherical bearing assembly operatively coupled to the bearing mount body; and
wherein the spherical bearing assembly is the spherical bearing assembly of any of paragraphs A1-A30.

B2. The line boring machine of paragraph B1, wherein the spherical bearing mount assembly is configured to support the boring bar such that the boring bar is free to translate relative to the spherical bearing assembly along the boring bar axis and to rotate relative to the spherical bearing assembly about the boring bar axis and such that the boring bar is restricted from translating relative to the spherical bearing assembly along a direction perpendicular to the boring bar axis.

B3. The line boring machine of any of paragraphs B1-B2, wherein the RDU assembly is operatively coupled to the spherical bearing assembly, optionally to the outer ring of the spherical bearing assembly.

B4. The line boring machine of paragraph B3, wherein the RDU assembly includes an RDU clamp collar configured to selectively engage the spherical bearing assembly, optionally the outer ring of the spherical bearing assembly, to operatively couple the RDU assembly to the spherical bearing assembly.

B5. The line boring machine of any of paragraphs B1-B4, wherein the bearing mount body is configured to be fixed relative to the workpiece; optionally wherein the bearing mount body is configured to be fixedly coupled to the workpiece.

B6. The line boring machine of paragraph B5, wherein the spherical bearing mount assembly includes one or more standoff plates operatively coupled to the bearing mount body and configured to be fixedly coupled, and optionally welded, to one or both of the workpiece and a structure that is fixed relative to the workpiece.

B7. The line boring machine of any of paragraphs B1-B6, wherein the bearing mount body includes a spherical bearing receiver; and wherein the outer ring of the spherical bearing assembly is at least partially received within the spherical bearing receiver during operative use of the line boring machine.

B8. The line boring machine of paragraph B7, wherein the spherical bearing mount assembly further includes one or more jacking screws operatively coupled to each of the bearing mount body and the spherical bearing assembly and configured to adjust a position of the spherical bearing assembly within the spherical bearing receiver.

C1. A method of utilizing the line boring machine of any of paragraphs B1-B8, the method comprising:
operatively coupling the boring bar to the spherical bearing assembly; and
mounting the spherical bearing mount assembly relative to the workpiece.

C2. The method of paragraph C1, wherein the operatively coupling the boring bar to the spherical bearing assembly includes:
inserting the boring bar into the tapered sleeve;
tightening the tapered sleeve upon the boring bar; and
locking the tapered sleeve relative to the adjustable receiver.

C3. The method of paragraph C2, wherein the tightening the tapered sleeve upon the boring bar includes reducing a/the sleeve inner diameter.

C4. The method of any of paragraphs C2-C3, wherein the tightening the tapered sleeve upon the boring bar includes screwing the interior nut against the adjustable receiver to translate the tapered sleeve in the outboard direction.

C5. The method of any of paragraphs C2-C4, wherein the tightening the tapered sleeve upon the boring bar includes tightening such that the boring bar is free to translate relative to the adjustable receiver along the boring bar axis and to rotate relative to the adjustable receiver about the boring bar axis and such that the boring bar is restricted from translating relative to the adjustable receiver along a direction perpendicular to the boring bar axis.

C6. The method of any of paragraphs C2-C5, wherein the tightening the tapered sleeve upon the boring bar includes tightening such that an/the interior nut thread outboard flank bears against a/the tapered sleeve thread inboard flank.

C7. The method of any of paragraphs C2-C6, wherein the locking the tapered sleeve relative to the adjustable receiver includes operatively coupling the exterior nut and the interior nut to one another.

C8. The method of paragraph C7, wherein the operatively coupling the exterior nut and the interior nut to one another includes biasing the exterior nut and the interior nut toward one another.

C9. The method of any of paragraphs C7-C8, when dependent from paragraph C6, wherein the operatively coupling the exterior nut and the interior nut to one another includes coupling such that the interior nut thread outboard flank continues bearing against the tapered sleeve thread inboard flank and such that an/the exterior nut thread inboard flank bears against a/the tapered sleeve thread outboard flank.

C10. The method of any of paragraphs C7-C9, wherein the operatively coupling the exterior nut and the interior nut to one another includes operatively coupling the exterior nut and the interior nut to one another with a/the plurality of locking screws.

C11. The method of paragraph C10, wherein the operatively coupling the exterior nut and the interior nut to one another includes:
threading the exterior nut onto the tapered sleeve such that a/the plurality of exterior nut fastener receivers are aligned with a/the plurality of interior nut fastener receivers;
inserting each locking screw into a/the respective exterior nut fastener receiver and a/the respective interior nut fastener receiver; and
tightening each locking screw such that the exterior nut and the interior nut are biased toward one another.

C12. The method of paragraph C10, wherein the operatively coupling the exterior nut and the interior nut to one another includes screwing each locking screw through a/the respective exterior nut fastener receiver to engage the interior nut and to bias the exterior nut and the interior nut apart from one another.

C13. The method of any of paragraphs C7-C12, wherein the operatively coupling the exterior nut and the interior nut to one another includes threading the exterior nut onto the tapered sleeve such that the exterior nut directly engages the interior nut, optionally such that the exterior nut exerts a force on the interior nut along an/the inboard direction and the interior nut exerts a force on the exterior nut along the outboard direction.

C14. The method of any of paragraphs C7-C13, when dependent from paragraph C6, wherein the operatively coupling the exterior nut and the interior nut to one another includes coupling such that an/the interior nut thread inboard flank bears against a/the tapered sleeve thread outboard flank and such that an/the exterior nut thread outboard flank bears against the tapered sleeve thread inboard flank.

C15. The method of any of paragraphs C1-C14, wherein the mounting the spherical bearing mount assembly relative to the workpiece includes mounting such that the bearing mount body is nominally fully fixed relative to the workpiece.

C16. The method of any of paragraphs C1-C15, wherein the mounting the spherical bearing mount assembly relative to the workpiece includes welding a/the one or more standoff plates to one or both of the workpiece and a/the structure that is fixed relative to the workpiece.

C17. The method of any of paragraphs C1-C16, further comprising:

centering the boring bar relative to a bore of the workpiece;

wherein the mounting the spherical bearing mount relative to the workpiece is performed at least partially subsequent to the centering the boring bar.

C18. The method of any of paragraphs C1-C17, further comprising:

operatively coupling the spherical bearing assembly to the bearing mount body.

C19. The method of paragraph C18, wherein the operatively coupling the spherical bearing assembly to the bearing mount body includes one or more of:

positioning the outer ring at least partially within the spherical bearing receiver;

operatively coupling a/the mounting flange to the bearing mount body via a/the plurality of mounting fasteners received within a/the plurality of mounting fastener receivers; and adjusting a position of the spherical bearing assembly relative to the bearing mount body with a/the one or more jacking screws.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first component that extends at least substantially around a second component includes a first component that extends around at least 75% of a circumference of the second component and also includes a first component that extends fully circumferentially around the second component.

As used herein, the phrase "nominally fully," when modifying a degree or relationship, includes the full extent of the recited degree or relationship as well as degrees or relationships that differ from the full extent of the recited degree or relationship by up to 1%. For example, a first direction that is nominally fully parallel to a second direction includes a first direction that is within an angular deviation of 0.9° relative to the second direction and also includes a first direction that is identical to the second direction. In this manner, the phrase "nominally fully" may be substituted in place of the phrase "at least substantially." Stated differently, as used herein, the phrase "at least substantially" is intended to encompass degrees or relationships that are described with the phrase "nominally fully."

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of apparatuses disclosed herein are not required to all apparatuses according to the present disclosure, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure or subsequently filed claims recite "a" or "a first" element or the equivalent thereof, such disclosure and/or claims should be understood to include incorporation of one or more such elements, neither requiring nor excluding two or more such elements.

The invention claimed is:

1. A spherical bearing assembly for a machine tool, the spherical bearing assembly comprising:
   an outer ring configured to be operatively coupled to a bearing mount body of a spherical bearing mount assembly of the machine tool;
   an adjustable receiver adjustably coupled to the outer ring and at least partially received within the outer ring; wherein the adjustable receiver includes an adjustable receiver inner surface that defines an adjustable receiver bore and that is tapered toward an outboard direction; and
   a locking bearing adapter configured to operatively couple the adjustable receiver to a boring bar of the machine tool;
   wherein the locking bearing adapter includes:
      a tapered sleeve partially received within the adjustable receiver bore and tapered toward the outboard direction; wherein the tapered sleeve includes:
         a sleeve bore with a sleeve inner diameter and configured to receive the boring bar; and
         a split seam configured to enable the tapered sleeve to radially expand and contract to adjust the sleeve inner diameter, thereby to tighten the tapered sleeve upon the boring bar;
      an interior nut threadingly coupled to the tapered sleeve and configured to engage the adjustable receiver; and
      an exterior nut threadingly coupled to the tapered sleeve and positioned adjacent to the interior nut, with the interior nut positioned between the exterior nut and the adjustable receiver; and
   wherein the exterior nut and the interior nut are configured to be operatively coupled to one another such that the interior nut and the exterior nut are locked in position relative to the tapered sleeve to restrict the sleeve inner diameter from varying during operative use of the spherical bearing assembly.

2. The spherical bearing assembly of claim 1, wherein, during operative use of the spherical bearing assembly, threading the interior nut onto the tapered sleeve and against the adjustable receiver urges the tapered sleeve to translate in the outboard direction and against the adjustable receiver inner surface, thereby to radially contract the tapered sleeve to bring the sleeve inner diameter to a target inner diameter; and
   wherein, during operative use of the spherical bearing assembly with the interior nut threaded onto the tapered sleeve, with the interior nut engaging the adjustable receiver, and with the sleeve inner diameter being equal to the target inner diameter, threading the exterior nut onto the tapered sleeve and operatively coupling the exterior nut and the interior nut to one another operates to lock the interior nut and the exterior nut in position relative to the tapered sleeve.

3. The spherical bearing assembly of claim 2, wherein the target inner diameter corresponds to a boring bar diameter of the boring bar.

4. The spherical bearing assembly of claim 1, wherein the outer ring includes an internal spherical bearing surface; and wherein the adjustable receiver includes an external spherical bearing surface that operatively and adjustably engages the internal spherical bearing surface such that a rotational orientation of the adjustable receiver relative to the outer ring is selectively adjustable while the external spherical bearing surface operatively engages the internal spherical bearing surface.

5. The spherical bearing assembly of claim 1, wherein the boring bar extends along a boring bar axis; and wherein the spherical bearing assembly is configured such that, when the boring bar is received within the tapered sleeve during operative use of the spherical bearing assembly, the boring bar axis is nominally fully parallel to an adjustable receiver central axis.

6. The spherical bearing assembly of claim 1, wherein the outer ring includes a mounting flange configured to operatively couple the spherical bearing assembly to the bearing mount body of the machine tool.

7. The spherical bearing assembly of claim 1, wherein the interior nut includes a captive nut collar; and wherein the adjustable receiver includes a captive nut receiver that receives at least a portion of the captive nut collar to at least partially restrict the interior nut from translating axially relative to the adjustable receiver during operative use of the spherical bearing assembly.

8. The spherical bearing assembly of claim 1, wherein one or both of the interior nut and the exterior nut includes one or more tool recesses configured to be engaged by a tool to selectively tighten and/or loosen the interior nut or the exterior nut upon the tapered sleeve.

9. The spherical bearing assembly of claim 1, wherein the tapered sleeve includes a tapered sleeve thread; wherein the interior nut includes an interior nut thread that threadingly engages the tapered sleeve thread; and wherein the exterior nut includes an exterior nut thread that threadingly engages the tapered sleeve thread.

10. The spherical bearing assembly of claim 9, wherein the tapered sleeve includes:
a tapered sleeve first end;
a tapered sleeve second end spaced apart from the tapered sleeve first end along an inboard direction that is opposite the outboard direction;
a threaded region including the tapered sleeve thread and positioned proximate to the tapered sleeve first end; and
an unthreaded region that engages the adjustable receiver inner surface and that is positioned proximate to the tapered sleeve second end.

11. The spherical bearing assembly of claim 1, wherein the locking bearing adapter further includes a plurality of locking screws configured to engage each of the exterior nut and the interior nut to operatively couple the exterior nut and the interior nut to one another.

12. The spherical bearing assembly of claim 1, wherein the locking bearing adapter is configured such that, during operative use of the spherical bearing assembly, the exterior nut is operatively coupled to the interior nut such that the exterior nut and the interior nut are biased toward one another.

13. The spherical bearing assembly of claim 12, wherein the tapered sleeve includes a tapered sleeve thread; wherein the interior nut includes an interior nut thread that threadingly engages the tapered sleeve thread; wherein the exterior nut includes an exterior nut thread that threadingly engages the tapered sleeve thread; wherein the interior nut thread includes an interior nut thread outboard flank that is directed toward the outboard direction and an interior nut thread inboard flank that is directed toward an inboard direction; wherein the exterior nut thread includes an exterior nut thread outboard flank that is directed toward the outboard direction and an exterior nut thread inboard flank that is directed toward the inboard direction; wherein the tapered sleeve thread includes a tapered sleeve thread outboard flank that is directed toward the outboard direction and a tapered sleeve thread inboard flank that is directed toward the inboard direction; and wherein the locking bearing adapter is configured such that, during operative use of the spherical bearing assembly, the interior nut thread outboard flank bears against the tapered sleeve thread inboard flank and the exterior nut thread inboard flank bears against the tapered sleeve thread outboard flank.

14. The spherical bearing assembly of claim 1, wherein the locking bearing adapter is configured such that, during operative use of the spherical bearing assembly, the exterior nut and the interior nut are operatively coupled to one another such that the exterior nut and the interior nut are biased away from one another.

15. The spherical bearing assembly of claim 14, wherein the tapered sleeve includes a tapered sleeve thread; wherein the interior nut includes an interior nut thread that threadingly engages the tapered sleeve thread; wherein the exterior nut includes an exterior nut thread that threadingly engages the tapered sleeve thread; wherein the interior nut thread includes an interior nut thread outboard flank that is directed toward the outboard direction and an interior nut thread inboard flank that is directed toward an inboard direction; wherein the exterior nut thread includes an exterior nut thread outboard flank that is directed toward the outboard direction and an exterior nut thread inboard flank that is directed toward the inboard direction; and wherein the locking bearing adapter is configured such that, during operative use of the spherical bearing assembly, the interior nut thread inboard flank bears against the tapered sleeve thread outboard flank and the exterior nut thread outboard flank bears against the tapered sleeve thread inboard flank.

16. The spherical bearing assembly of claim 14, wherein the locking bearing adapter further includes a plurality of locking screws configured to engage each of the exterior nut and the interior nut to operatively couple the exterior nut and the interior nut to one another; wherein the exterior nut defines a plurality of exterior nut fastener receivers; wherein each locking screw of the plurality of locking screws extends through a respective exterior nut fastener receiver of the plurality of exterior nut fastener receivers when the exterior nut is operatively coupled to the interior nut; wherein each locking screw of the plurality of locking screws is threadingly coupled to the respective exterior nut fastener receiver and bears against the interior nut to bias the exterior nut and the interior nut away from one another when the exterior nut is operatively couple to the interior nut.

17. The spherical bearing assembly of claim 14, wherein the locking bearing adapter is configured such that, during operative use of the spherical bearing assembly and when the exterior and the interior nut are operatively coupled to one another, the exterior nut is threaded onto the tapered sleeve such that the exterior nut directly engages the interior nut.

18. The spherical bearing assembly of claim 17, wherein the locking bearing adapter is configured such that, during operative use of the spherical bearing assembly, the exterior nut exerts a force on the interior nut along an inboard direction and the interior nut exerts a force on the exterior nut along the outboard direction.

19. A line boring machine for machining a surface of a workpiece, the line boring machine comprising:
a boring bar extending along a boring bar axis;
a cutting tool operatively coupled to the boring bar for machining the surface of the workpiece;
a spherical bearing mount assembly at least partially supporting the boring bar;
a rotational drive unit (RDU) assembly configured to rotate the boring bar about the boring bar axis; and
an axial feed unit (AFU) assembly configured to translate the boring bar along the boring bar axis;
wherein the spherical bearing mount assembly includes:

a bearing mount body; and
the spherical bearing assembly of claim 1 operatively coupled to the bearing mount body.

20. A method of utilizing the line boring machine of claim 19, the method comprising:
operatively coupling the boring bar to the spherical bearing assembly; and
mounting the spherical bearing mount assembly relative to the workpiece.

\* \* \* \* \*